United States Patent
Kato et al.

(10) Patent No.: US 8,433,490 B2
(45) Date of Patent: Apr. 30, 2013

(54) CONTROL DEVICE FOR VEHICLE BRAKE SYSTEM

(75) Inventors: Tomohiro Kato, Toyohashi (JP);
Masanobu Yamaguchi, Okazaki (JP);
Koichi Tomida, Toyota (JP)

(73) Assignee: Advics Co., Ltd., Kariya (JP)

( * ) Notice: Subject to any disclaimer, the term of this patent is extended or adjusted under 35 U.S.C. 154(b) by 804 days.

(21) Appl. No.: 12/633,604

(22) Filed: Dec. 8, 2009

(65) Prior Publication Data
US 2010/0161191 A1    Jun. 24, 2010

(30) Foreign Application Priority Data
Dec. 22, 2008  (JP) ................................ 2008-326317

(51) Int. Cl.
*B60T 13/16*  (2006.01)
*B60T 13/18*  (2006.01)
*B60T 13/66*  (2006.01)
*G06F 19/00*  (2011.01)

(52) U.S. Cl.
USPC ................................ 701/70; 303/10; 303/11

(58) Field of Classification Search ................ 701/1, 36, 701/70, 29.1; 303/10, 11, 113.1, 113.4, 114.1, 303/114.3; 60/547.1, 550; 188/151 R, 152
See application file for complete search history.

(56) References Cited

U.S. PATENT DOCUMENTS

| | | | | |
|---|---|---|---|---|
| 5,496,099 A | * | 3/1996 | Resch | 303/114.1 |
| 5,584,543 A | * | 12/1996 | Sawada | 303/191 |
| 6,010,198 A | * | 1/2000 | Nakazawa | 303/113.1 |
| 6,322,164 B1 | | 11/2001 | Sakamoto et al. | |

FOREIGN PATENT DOCUMENTS

| | | |
|---|---|---|
| JP | 11-020670 A | 1/1999 |
| JP | 11-020671 A | 1/1999 |
| JP | 2000-127949 A | 5/2000 |
| JP | 2001-080497 A | 3/2001 |

\* cited by examiner

*Primary Examiner* — Thomas Tarcza
*Assistant Examiner* — Edward Pipala
(74) *Attorney, Agent, or Firm* — Buchanan Ingersoll & Rooney PC

(57) ABSTRACT

A control device for a vehicle brake system includes first judgment value derivation and storage means for deriving and storing as first judgment value a boosting limit judgment pressure which, if predetermined conditions are satisfied during the driving of hydraulic pumps by boost control means, a boosting limit judgment pressure calculation means calculates at the time when the predetermined conditions are satisfied, and returning start judgment means for judging whether the returning of the brake manipulation member has been started or not. The boost control means executes the boost control using as the boosting limit judgment pressure the first judgment value stored in the first judgment value derivation and storage means when the returning start judgment means judges during the driving of the pumps that the returning of the brake manipulation member has been started.

10 Claims, 8 Drawing Sheets

US 8,433,490 B2

CONTROL DEVICE FOR VEHICLE BRAKE SYSTEM

INCORPORATION BY REFERENCE

This application is based on and claims priority under 35 U.S.C. 119 with respect to Japanese Application No. 2008-326317 filed on Dec. 22, 2008, the entire content of which is incorporated herein by reference.

BACKGROUND OF THE INVENTION

1. Field of the Invention

The present invention relates to a control device for vehicle brake systems.

2. Discussion of the Related Art

Heretofore, as one form of control devices for vehicle brake systems, there has been known one which is described in Japanese unexamined, published patent application No. 11-20670 (JP11-20670 A equivalent of (U.S. Pat. No. 6,322,164 B1). As shown in FIG. 11 of the Japanese published application (FIG. 101 of the U.S. patent), the control device of a vehicle brake system takes thereinto a booster pressure signal (step S5) when a booster pressure switch 204 is normal in operation, and then, judges based on the taken booster pressure signal whether the booster 12 is in the state of a boosting limit reached or not (step S6). If judging that the booster 12 is in the state of the boosting limit reached, the control device performs a pressure increase control (step S8). Concretely, the control device activates a pump 62 to generate in brake cylinders 50 a pressure which is higher by a differential pressure ΔP than a master cylinder hydraulic pressure $P_M$ so that the braking effect can be made to be stable irrespective of the booster 12 being in around the boosting limit (refer to FIGS. 13 and 14 of the Japanese published application (FIGS. 103 and 65 of the U.S. patent). On the other hand, if judging that the booster is not in the state of the boosting limit reached, the control device performs a processing for terminating the pressure increase control (step S7).

However, regarding the booster 12 in the foregoing brake system, the booster 12, due to its structure, brings about a fluctuation (i.e., temporary drop) of the vacuum pressure in its vacuum pressure chamber when a brake pedal 10 is returned. Specifically, as shown in FIG. 7 of the Japanese published application, when the brake pedal 10 returns, a control valve 23a takes seat on an air valve 23b as it is separated from a vacuum valve 23c. This causes a variable pressure chamber 18 to be blocked from the atmosphere and to communicate with a vacuum pressure chamber 17, whereby the pressure of the variable pressure chamber 18 drops temporarily. As a consequence, the pressure in the vacuum pressure chamber 17 in communication with the variable pressure chamber 18 also drops temporarily. In this way, there is arisen a problem that the variation in the vacuum pressure makes it impossible to terminate the pressure increase control at an appropriate timing.

SUMMARY OF THE INVENTION

Accordingly, it is a primary object of the present invention to provide an improved control device for a vehicle brake system, capable of performing the termination of a boost control at a desired, appropriate timing.

Briefly, according to the present invention, there is provided a control device for a vehicle brake system having a master cylinder for building up a brake hydraulic pressure depending on the manipulation of a brake manipulation member; a vacuum booster for boosting the manipulation force of the brake manipulation member by utilizing a pressure difference between a vacuum pressure chamber supplied with a vacuum pressure and a variable pressure chamber adjoining the vacuum pressure chamber through a diaphragm, to output the boosted manipulation force to the master cylinder; wheel cylinders for applying a brake force to respective wheels of a vehicle upon receipt of the brake hydraulic pressure supplied from the master cylinder; a hydraulic pump connected to fluid passages connecting the master cylinder to the wheel cylinders for building up a brake hydraulic pressure by being driven by an output of an electric motor and for supplying the wheel cylinders with the brake hydraulic pressure independently of the master cylinder; a vacuum pressure sensor for detecting the vacuum pressure in the vacuum pressure chamber of the vacuum booster; and a master cylinder pressure sensor for detecting the pressure in the master cylinder. The control device comprises vacuum pressure acquisition means for acquiring the vacuum pressure in the vacuum pressure chamber of the vacuum booster from the vacuum pressure sensor; master cylinder pressure acquisition means for acquiring the pressure in the master cylinder from the master cylinder pressure sensor; first storage means for storing a vacuum-boosting limit pressure map representing a relation between various vacuum pressures in the vacuum pressure chamber of the vacuum booster and various boosting limit pressures being pressures in the master cylinder which respectively correspond to various boosting limits of the vacuum booster at the various vacuum pressures; boosting limit judgment pressure calculation means for calculating as the boosting limit judgment pressure a boosting limit pressure which is obtained from a vacuum pressure acquired by the vacuum pressure acquisition means and the vacuum-boosting limit pressure map stored in the first storage means; boost control means for executing a boost control that if the master cylinder pressure acquired by the master cylinder pressure acquisition means is equal to or higher than the boosting limit judgment pressure calculated by the boosting limit judgment pressure calculation means, the boost control means drives the hydraulic pump to build up a brake hydraulic pressure and supplies the wheel cylinders with a resultant hydraulic pressure which is made by adding the pump-built hydraulic pressure to a master cylinder pressure built up in dependence on the manipulation of the brake manipulation member and that if the master cylinder pressure is lower than the boosting limit judgment pressure, the boost control means stops the driving of the hydraulic pump; first judgment value derivation and storage means for deriving and storing as first judgment value a boosting limit judgment pressure which, if a predetermined condition is satisfied during the driving of the hydraulic pump by the boost control means, the boosting limit judgment pressure calculation means calculates at the time when the predetermined condition is satisfied; and returning start judgment means for judging whether the returning of the brake manipulation member is started or not. The boost control means executes the boost control using as the boosting limit judgment pressure the first judgment value stored in the first judgment value derivation and storage means when the returning start judgment means judges during the driving of the pump that the returning of the brake manipulation member is started.

With this construction, the boost control means executes the boost control wherein the boost control means drives the hydraulic pump and supplies wheel cylinders with the resultant pressure which is made by adding the break hydraulic pressure built up by the driving of the pump to the master cylinder pressure built up in dependence on the manipulation of the brake manipulation member if the master cylinder pressure acquired by the master cylinder pressure acquisition means is equal to or higher than the boosting limit judgment pressure calculated by the boosting limit judgment pressure calculation means, and stops the driving of the hydraulic pump if the master cylinder pressure is lower than the boosting limit judgment pressure. Further, if the predetermined condition is satisfied when the boost control means is driving the hydraulic pump, the first judgment value derivation and storage means derives and stores as the first judgment value the boosting limit judgment pressure which is calculated by the boosting limit judgment pressure calculation means at the time when the predetermined condition is satisfied. The returning start judgment means judges whether the returning of the brake manipulation member is started or not. Then, if the returning start judgment means judges during the driving of the hydraulic pump that the returning of the brake manipulation member is started, the boost control means executes the boost control using as the boosting limit judgment pressure the first judgment value stored in the first judgment value derivation and storage means.

Thus, when the returning of the brake manipulation member is started during the driving of the hydraulic pump by the boost control means, the boost control is not executed by the use of the boosting limit judgment pressure which fluctuates with the change in the vacuum pressure in the vacuum pressure chamber of the vacuum booster in the course of the returning of the brake manipulation member, but can be executed by the use of the first judgment value which has been calculated and stored based on the vacuum pressure at the time when the predetermined condition has been satisfied and which does not fluctuate with the change in the vacuum pressure. Accordingly, even when the vacuum pressure in the vacuum pressure chamber of the vacuum booster fluctuates, the driving of the hydraulic pump under the boost control can be terminated at a desired, appropriate timing without being subjected to the influence of the fluctuation.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
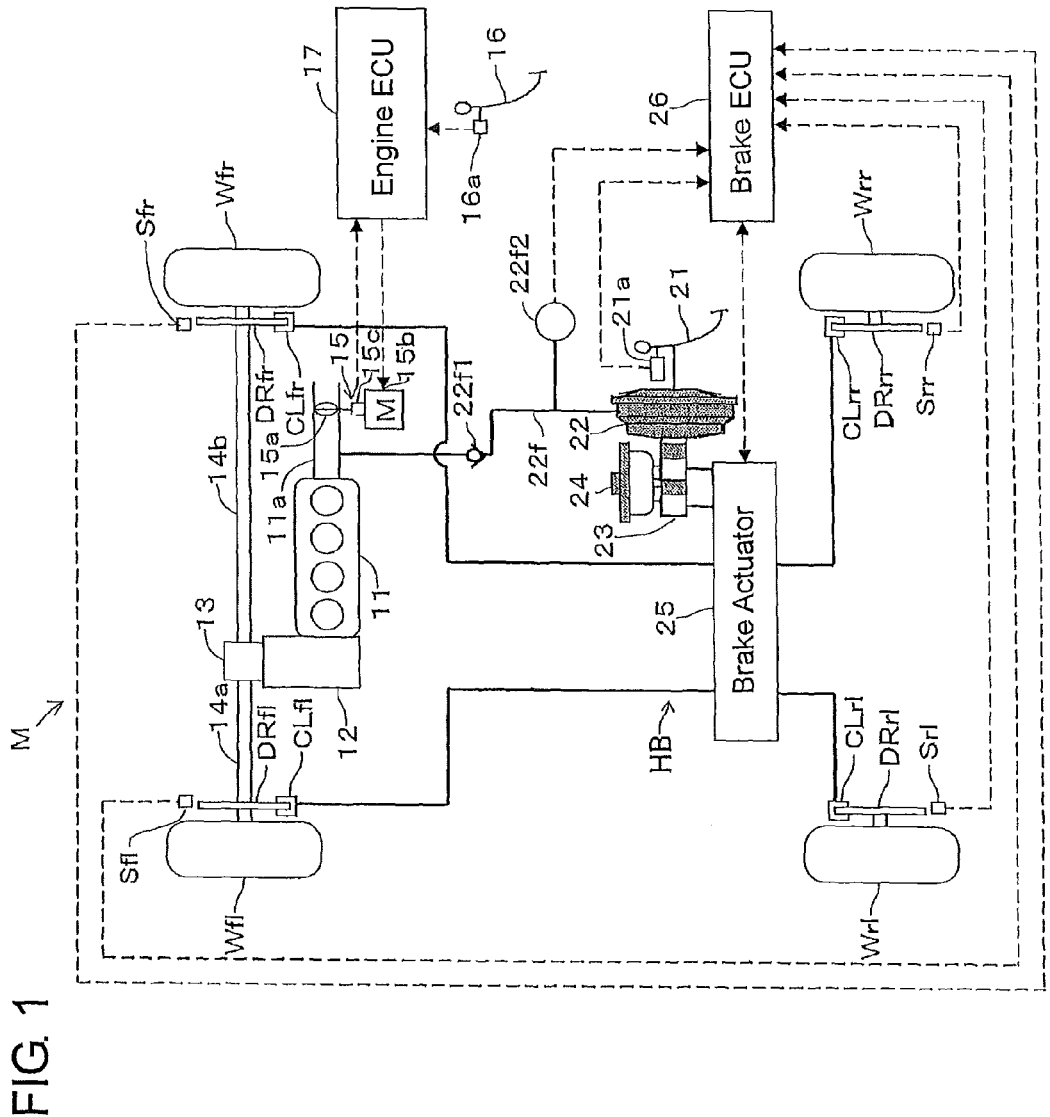
FIG. 1 is a schematic block diagram of a vehicle incorporating a control device for a vehicle brake system in one embodiment according to the present invention.
Figure 2:
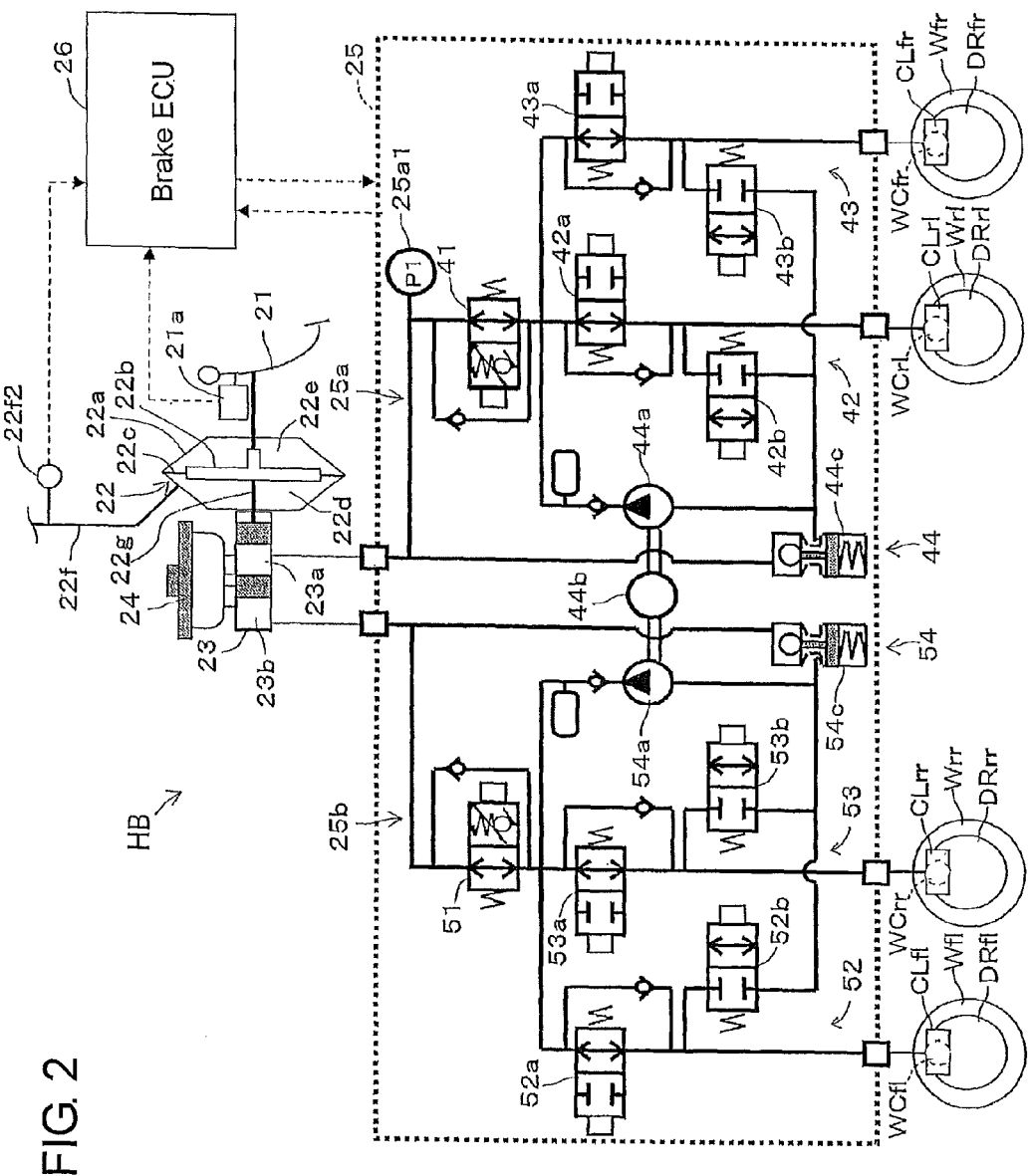
FIG. 2 is a circuit diagram of a brake actuator incorporated in the system shown in FIG. 1.

Hereafter, a vehicle incorporating a control device for a vehicle brake system in one embodiment according to the present invention will be described with reference to the accompanying drawings. FIG. 1 is a schematic view showing the construction of the vehicle, and FIG. 2 is a schematic view showing the construction of a hydraulic brake system. As shown in FIG. 1, the vehicle M is a front-wheel drive vehicle of the type that the driving force from an engine 11 being a driving source mounted at a front part of a vehicle body (not shown) is transmitted not to rear wheels but to front wheels. The vehicle M is not limited to the front-wheel drive vehicle and may be a vehicle of another driving system such as, for example, a rear-wheel drive vehicle or all wheeled vehicle.

The vehicle M is provided with the engine 11, a transmission 12, a differential gear 13 and left and right drive shafts 14a, 14b. The driving power of the engine 11 is changed in speed by the transmission 12 and is transmitted to left and right front wheels Wfl, Wfr being driving wheels through the differential gear 13 and the left and right drive shafts 14a, 14b. The engine 11 is provided with an intake manifold 11a for allowing air to flow into combustion chambers of the engine 11, and the intake manifold 11a is provided therein with a throttle valve 15a for adjusting the opening degree of the intake manifold 11a to regulate the air quantity passing through the intake manifold 11a.

The throttle vale 15a is not of a wired type that connects a gas pedal 16 with the throttle valve 15a by means of a wire, but an electronically controlled type. Specifically, the throttle valve 15a is made to be opened or closed by being driven by an electric motor 15b which responds to a command from an engine control ECU (Electronic Control Unit) 17, and the opening degree of the throttle valve 15a is detected by a throttle opening degree sensor 15c. The detection signal from the sensor 15c is transmitted to the engine control ECU 17, so that a feedback control can be performed to make the opening degree of the throttle valve 15a follow a command value from the engine control ECU 17. Basically, the engine control ECU 17 receives a signal indicating the stepping amount of the gas pedal 16 which is detected by a gas pedal stepping-amount sensor 16a and transmits to the electric motor 15b a command value corresponding to the opening degree of the throttle valve 15a which coincides with the stepping-amount of the gas pedal 16. Further, the engine control ECU 17 receives the state of the engine 11 which state can be grasped by various sensors (not shown) attached to and around the engine 11 and transmits to the electric motor 15b a command value corresponding to the opening degree which is determined with the detected engine state taken into consideration.

The transmission 12 comprises an automatic transmission for gear-changing the driving power from the engine 11 to be outputted to the driving wheels. The transmission 12 is of the type that has plural (e.g., four) forward steps and one reverse step. The transmission 12 performs gear changes based on the load imposed on the vehicle and the vehicle speed within a speed change step corresponding to a driver-selected range.

Further, the vehicle M is provided with a hydraulic brake system (brake system) HB for braking the vehicle M. The hydraulic brake system HB is composed of respective wheel cylinders WCfl, WCfr, WCrl, WCrr, a brake pedal 21 being a brake manipulation member, a vacuum booster 22, a master cylinder 23, a reservoir tank 24, a brake actuator 25 being an automatic hydraulic pressure generation unit, and a brake ECU (Electronic Control Unit) 26 being a control device for the brake system HB.

The respective wheel cylinders WCfl, WCfr, WCrl, WCrr serve to restrict the rotations of respective wheels Wfl, Wfr, Wrl, Wrr and are provided in respective calipers CLfl, CLfr, CLrl, CLrr, respectively. When a base hydraulic pressure being first hydraulic pressure, a boosting hydraulic pressure being second hydraulic pressure or an additional or controlled hydraulic pressure being third hydraulic pressure is supplied to the respective wheel cylinders WCfl, WCfr, WCrl, WCrr, respective pairs of pistons (not shown) in the respective wheel cylinders WCfl, WCfr, WCrl, WCrr push respective pairs of brake pads (not shown) being friction members, whereby disc rotors DRfl, DRfr, DRrl, DRrr rotatable bodily with the respective wheels Wfl, Wfr, Wrl, Wrr are sandwiched or pinched from axial opposite sides to be restricted from being rotated, respectively. Although disc type brakes are employed in this embodiment, there may be employed drum type brakes.

The vacuum booster 22 is a device which is capable of generating a boosting hydraulic pressure (hydraulic pressure generated by the force acting on a power piston) by boosting the manipulation force of the brake pedal 21 in dependence on the manipulation force applied to the brake pedal 21 by the action of a negative or vacuum pressure being the pressure supplied from the engine 11 which also serves as a negative or vacuum pressure supply, and of utilizing the boosting hydraulic pressure to apply second friction brake forces on the respective wheels Wfl, Wfr, Wrl, Wrr by applying the boosting hydraulic pressure to the respective wheel cylinders WCfl, WCfr, WCrl, WCrr.

Specifically, as shown in FIG. 2, the vacuum booster 22 is provided with a power cylinder 22a, the aforementioned power piston 22b received in the power cylinder 22a to be movable reciprocally, a diaphragm 22c interposed between the power cylinder 22a and the power piston 22b, and a power cylinder vacuum pressure chamber 22d and a power cylinder atmospheric pressure chamber (variable pressure chamber) 22e into which the interior of the power cylinder 22a is divided by the power piston 22b and the diaphragm 22c. The power cylinder vacuum pressure chamber 22d is connected to the intake manifold 11a of the engine 11 through a connection pipe 22f to be supplied with the engine vacuum pressure (negative or minus pressure). The power cylinder atmospheric pressure chamber 22e is able to be selectively opened to the atmosphere. Thus, the vacuum booster 22 performs a boosting operation that generates a gas pressure difference between opposite sides of the power piston 22b (i.e., the difference between the vacuum pressure and the atmospheric pressure), converts the pressure difference into a thrust or boosting force acting on the power piston 22b and applies the boosting force to pistons in the master cylinder 23 through a push rod 22g. As shown in FIG. 1, the connection pipe 22f is provided with a check valve 22/1 for allowing gas to flow only from the vacuum booster 22 toward the intake manifold 11a.

The hydraulic brake system HB is provided with a vacuum pressure sensor (vacuum detection means) 22/2 for detecting the negative or vacuum pressure applied to the vacuum booster 22, that is, the negative or vacuum pressure in the intake manifold 11a of the engine 11 (i.e., the negative pressure in the connection pipe 22f), and a detection signal from the sensor 22/2 is transmitted to the brake ECU 26. The vacuum pressure sensor 22/2 detects the negative pressure in the vacuum pressure chamber 22d of the vacuum booster 22 which chamber is connected to the connection pipe 22f.

The master cylinder 23 converts the input from the push rod 22g into a hydraulic pressure (base hydraulic pressure plus boosting hydraulic pressure) and supplies the hydraulic pressure to the respective wheel cylinders WCfl, WCfr, WCrl, WCrr. More specifically, the master cylinder 23 inputs thereto a resultant force (brake manipulation force boosted by the vacuum booster 22) of the manipulation force (i.e., stepping force) of the brake pedal 21 by the driver and a force which is generated by the power piston 22b of the vacuum booster 22 upon such manipulation and converts the inputted resultant force into a hydraulic pressure composed of a base hydraulic pressure and a boosting hydraulic pressure to output the converted hydraulic pressure. The base hydraulic pressure is a hydraulic pressure component generated by the manipulation force (stepping force) of the brake pedal 21, whereas the boosting hydraulic pressure is another hydraulic pressure component generated by the power piston 22b. The base hydraulic pressure serves to make a first friction brake force act on the respective wheels Wfl, Wfr, Wrl, Wrr.

The reservoir tank 24 stores brake fluid therein and replenishes the brake fluid to the master cylinder 23.

The brake actuator 25 is provided between the master cylinder 23 and the respective wheel cylinders WCfl, WCfr, WCrl, WCrr. The brake actuator 25 is a device which is capable of automatically generating additional or controlled hydraulic pressures independently of (i.e., regardless of) the manipulation of the brake pedal 21 and of applying the controlled hydraulic pressures to the wheel cylinders WCfl, WCfr, WCrl, WCrr so that a third brake force acts on each of the wheels Wfl, Wfr, Wrl, Wrr.

The construction of the brake actuator 25 will be described in detail with reference to FIG. 2. The brake actuator 25 is composed of plural systems being hydraulic circuits which are operable independently of each other. Specifically, the brake actuator 25 has a first system 25a and a second system 25b arranged in an X or cross piping fashion. The first system 25a connects a first hydraulic chamber 23a of the master cylinder 23 to the wheel cylinders WCrl, WCfr of the left-rear wheel Wrl and the right-front wheel Wfr and undertakes the brake force control for the left-rear wheel Wrl and the right-front wheel Wfr. The second system 25b connects a second hydraulic chamber 23b of the master cylinder 23 to the wheel cylinders WCfl, WCrr of the left-front wheel Wfl and the right-rear wheel Wrr and undertakes the brake force control for the left-front wheel Wfl and the right-rear wheel Wrr.

The first system 25a is composed of a differential pressure control valve 41, a left-rear wheel hydraulic pressure control section 42, a right-front wheel hydraulic pressure control section 43 and a first pressure reducing section 44.

The differential pressure control valve 41 is a normally open linear electromagnetic valve which is interposed between the master cylinder 23 and upper streams of the left-rear wheel hydraulic pressure control section 42 and the right-front wheel hydraulic pressure control section 43. The differential pressure control valve 41 is controllable by the brake ECU 26 to be switched selectively into a full-open state (the state of no differential pressure) or a differential pressure state. Ordinarily, the differential pressure control valve 41 is in the full-open state by being kept deenergized. However, when electrified to be urged toward the differential pressure state (closed side), the differential pressure control valve 41 is able to hold the hydraulic pressure on the wheel cylinders WCrl, WCfr side higher by a predetermined controlled differential pressure than the hydraulic pressure of the master cylinder 23 side. This controlled differential pressure is regulated in dependence on a control current determined by the brake ECU 26. Thus, a controlled hydraulic pressure corresponding to the controlled differential pressure can be built up by the aid of the pressurization by pumps 44a, 54a.

The left-rear wheel hydraulic pressure control section 42 is capable of controlling the hydraulic pressure supplied to the wheel cylinder WCrl and is composed of a pressure increase valve 42a being a normally open electromagnetic shutoff valve of a two-port, two-switchable position type and a pressure reducing valve 42b being a normally closed electromagnetic shutoff valve of a two-port, two-switchable position type. The pressure increase valve 42a is interposed between the differential pressure control valve 41 and the wheel cylinder WCrl and is able to make the differential pressure control valve 41 and the wheel cylinder WCrl communicate with each other or blocked therefrom in response to a command from the brake ECU 26. The pressure reducing valve 42b is interposed between the wheel cylinder WCrl and a pressure regulation reservoir 44c and is able to make the wheel cylinder WCrl and the pressure regulation reservoir 44c communicate with each other or blocked therefrom in response to a command from the brake ECU 26. Thus, the hydraulic pressure in the wheel cylinder WCrl can selectively be increased, retained or reduced.

The right-front wheel hydraulic pressure control section 43 is capable of controlling the hydraulic pressure supplied to the wheel cylinder WCfr and, like the left-rear wheel hydraulic pressure control section 42, is composed of a pressure increase valve 43a and a pressure reducing valve 43b. The pressure increase valve 43a and the pressure reducing valve 43b are controllable in response to commands from the brake ECU 26, so that the hydraulic pressure in the wheel cylinder WCfr can selectively be increased, retained or reduced.

The first pressure reducing section 44 is composed of the pump (hydraulic pump) 44a, a pump drive motor (electric motor) 44b, and the pressure regulation reservoir 44c. The pump 44a is operable for drawing brake fluid in the pressure regulation reservoir 44c to supply the brake fluid between the differential pressure control valve 41 and the pressure increase valves 42a, 43a. The pump 44a is driven by the pump drive motor 44b which is driven in response to a command from the brake ECU 26.

The pressure regulation reservoir 44c is a device capable of temporarily storing the brake fluid drained from the wheel cylinders WCrl, WCfr through the pressure reducing valves 42a, 43b. Further, the pressure regulation reservoir 44c is in communication with the master cylinder 23. Thus, when the quantity of the brake fluid in the pressure regulation reservoir 44c is lower than a predetermined quantity, the pressure regulation reservoir 44c is supplied with brake fluid from the master cylinder 23. When the quantity is higher than the predetermined quantity, on the other hand, the supply of brake fluid from the master cylinder 23 is stopped.

Therefore, it becomes possible to supply the brake fluid supplied from the master cylinder 23 to the upper streams of the pressure increase valves 42a, 43a by way of the pressure regulation reservoir 44c while the pump 44a is being driven with the differential pressure control valve 41 creating the differential pressure state (for example, in the case of a side-slip prevention control, a traction control or the like).

The second system 25b is composed of a differential pressure control valve 51, a left-front wheel hydraulic pressure control section 52, a right-rear wheel hydraulic pressure control section 53 and a second pressure reducing section 54.

The differential pressure control valve 51 is a normally open linear electromagnetic valve which is interposed between the master cylinder 23 and upper streams of the left-front wheel hydraulic pressure control section 52 and the right-rear wheel hydraulic pressure control section 53. Like the differential pressure control valve 41, the differential pressure control valve 51 is controllable by the brake ECU 26 to hold the hydraulic pressure on the wheel cylinders WCfl, WCrr side higher by a predetermined controlled differential pressure than the hydraulic pressure of the master cylinder 23 side.

The left-front wheel hydraulic pressure control section 52 and the right-rear wheel hydraulic pressure control section 53 are capable of respectively controlling the hydraulic pressures supplied to the wheel cylinders WCfl, WCrr and, like the left-rear and right-front wheel hydraulic pressure control sections 42 and 43, are composed respectively of the pair of a pressure increase valve 52a and a pressure reducing valve 52b and the pair of a pressure increase valve 53a and a pressure reducing valve 53b. The pair of the pressure increase valve 52a and the pressure reducing valve 52b and the pair of the pressure increase valve 53a and the pressure reducing valve 53b are controllable respectively in response to commands from the brake ECU 26, so that the hydraulic pressure in each of the wheel cylinders WCfl and WCrr can selectively be increased, retained and reduced in turn.

Like the first pressure reducing section 44, the second pressure reducing section 54 is composed of the pump (hydraulic pump) 54a, the pump drive motor 44b (electric motor used in common to the first pressure reducing section 44), and a pressure regulation reservoir 54c. The pump 54a draws the brake fluid in the pressure regulation reservoir 54c as the pump 44a does with the pressure regulation reservoir 44c, and supplies the drawn brake fluid between the differential pressure control valve 51 and the pressure increase valves 52a, 53a. The pump 54a is driven by the pump drive motor 44b which is driven in response to a command from the brake ECU 26.

In the brake actuator 25 as constructed above, at the time of an ordinary braking operation, all of the electromagnetic valves are held in a deenergized state, so that a brake hydraulic pressure corresponding to the manipulation force of the brake pedal 11, that is, a base hydraulic pressure plus a boosting hydraulic pressure can be supplied to the wheel cylinders WC. It is to be noted that symbols "" are suffixes corresponding to one of the wheels and denote any of symbols "fl, fr, rl and rr" which respectively represent left-front, right-front, left-rear and right-rear. These symbols are used in the same meanings throughout the present description and the accompanying drawings.

Further, when the differential pressure control valves 41, 51 are energized with the pump drive motor 44b and hence, the pumps 44a, 54a being driven, it becomes possible to supply the wheel cylinders WC** with a brake hydraulic pressure which is made up by adding the controlled hydraulic pressure to the base hydraulic pressure plus the boosting hydraulic pressure which come from the master cylinder 23.

Further, the brake actuator 25 is capable of individually adjusting the hydraulic pressures in the respective wheel cylinders WC** by controlling the pressure increase valves 42a, 43a, 52a, 53a and the pressure reducing valves 42b, 43b, 52b, 53b. Thus, it becomes possible to perform various well-known controls such as, for example, anti-skid control, front-rear brake force distribution control, side-slip prevention control (specifically, understeer suppression control and oversteer suppression control), traction control, vehicle-to-vehicle distance control or the like.

The brake actuator 25 is further provided with a pressure sensor (master cylinder pressure detection means) 25a1 for detecting a master cylinder pressure being the brake hydraulic pressure in the master cylinder 23, and a detection signal therefrom is transmitted to the brake ECU 26. In this particular embodiment, the pressure sensor 25a1 is provided between the master cylinder 23 and the differential pressure control valve 41 in the first system 25a. However, it may be provided at an equivalent position in the second system 25b.

Further, as shown in FIGS. 1 and 2, the hydraulic brake system HB is provided with a pedal stroke sensor 21a for detecting the stroke amount of the brake pedal 21. A detection signal from the sensor 21a is transmitted to the brake ECU 26. The stroke amount of the brake pedal 21 represents the manipulation state of the brake pedal 21, and hence, the pedal stroke sensor 21a constitutes brake manipulation state detection means.

Further, as shown in FIG. 1, the hydraulic brake system HB is provided with wheel speed sensors Sfl, Sfr, Srl, Srr. The wheel speed sensors Sfl, Sfr, Srl, Srr are provided at positions adjacent to the respective wheels Wfl, Wfr, Wrl, Wrr and output to the brake ECU 26 pulse signals of the frequencies respectively corresponding to the rotational speeds of the wheels Wfl, Wfr, Wrl, Wrr.

The brake ECU 26 has a microcomputer (not shown), and the microcomputer is composed of an input/output interface, a CPU, a RAM and a ROM (all not shown) which are mutually connected through bus lines. By executing programs represented by the flow charts shown in FIGS. 8 to 10, the CPU controls the brake actuator 25 to make up (i.e., compensate for) a deficiency or shortfall of pressure when a vacuum pressure supplied to the vacuum booster 22 is insufficient relative to a predetermined pressure required to generate a desired braking force, so that each wheel cylinder WC** can be supplied with a target brake fluid pressure which meets the manipulation of the brake pedal 21.

Figure 3:
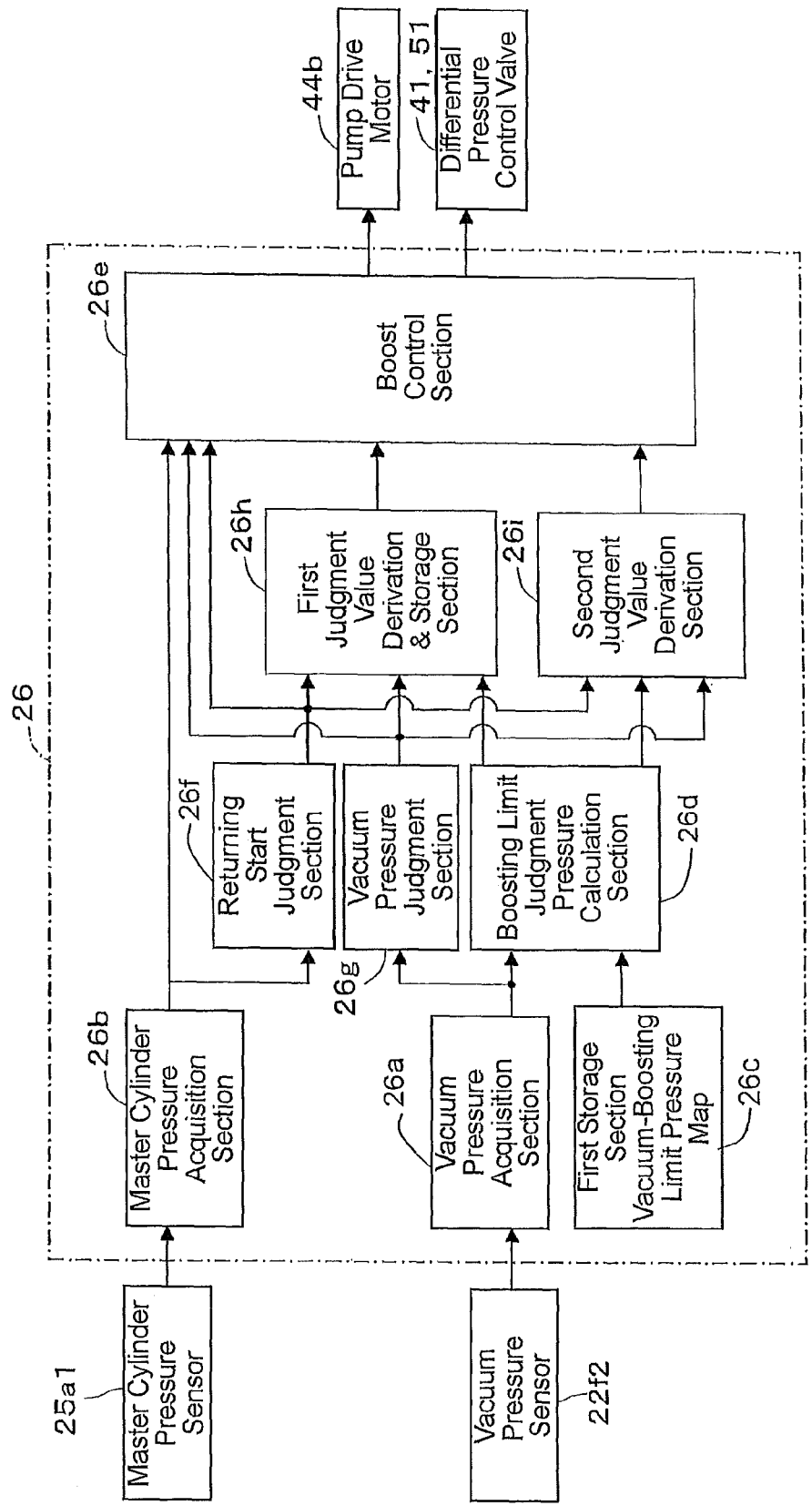
FIG. 3 is a block diagram of a brake ECU as the control device shown in FIGS. 1 and 2.

The brake ECU 26 is a control device for controlling the hydraulic brake system HB. As shown in FIG. 3, the brake ECU 26 is provided with a vacuum pressure acquisition section (vacuum pressure acquisition means) 26a for acquiring the vacuum pressure being supplied to the vacuum booster 22 (i.e., the vacuum pressure in the vacuum pressure chamber 22d of the vacuum booster 22) from a vacuum pressure sensor 22f2 and a master cylinder pressure acquisition section (master cylinder pressure acquisition means) 26b for acquiring the pressure in the master cylinder 23 from the master cylinder pressure sensor 25a1. The brake ECU 26 has a first storage section (first storage means) 26c which stores therein a vacuum-boosting limit map. The vacuum-boosting limit map defines a relation between vacuum pressure supplied to the vacuum booster 22 (i.e., vacuum pressure in the vacuum pressure chamber 22d of the vacuum booster 22) and boosting limit pressure being the pressure in the master cylinder 23 which correspond to a boosting limit for the vacuum booster 22 at a given vacuum pressure.

Figure 4:
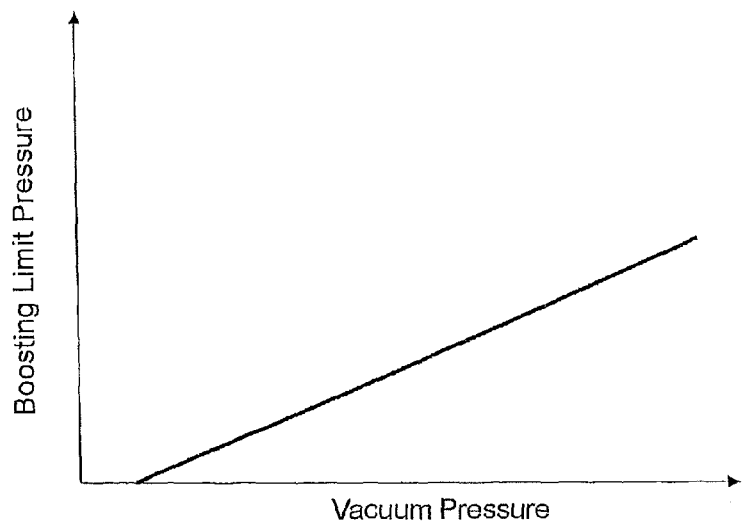
FIG. 4 is a graph showing a vacuum-boosting limit pressure map.
Figure 5:
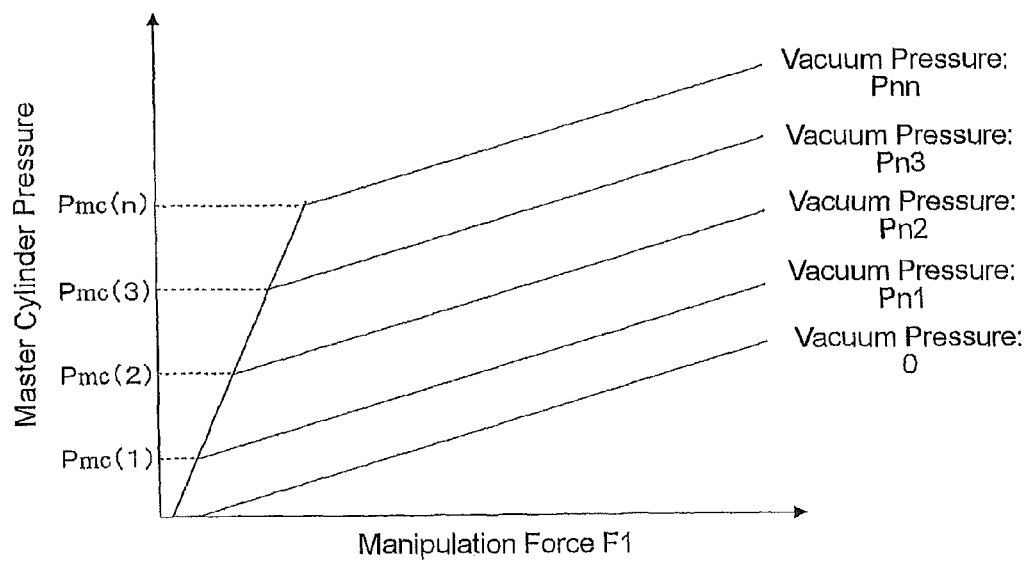
FIG. 5 is a graph showing relations between brake pedal manipulation forces and master cylinder pressures at various levels of vacuum pressure.

The vacuum-boosting limit map stored in the first storage section 26c in advance is an original or initial map like that shown in FIG. 4. This initial map represents design values which can be obtained by simulation or based on actual experimental values. The vacuum-boosting limit map can be obtained from the relations of master cylinder pressures to manipulation forces F1 at respective vacuum pressures shown in FIG. 5.

The vacuum booster 22 causes the pressure in the atmospheric pressure chamber 22e to reach the atmospheric pressure when the manipulation force F1 of the brake pedal 21 increases up to a certain value (i.e., when the pressure difference between the vacuum pressure chamber 22d and the atmospheric pressure chamber 22e does not increase irrespective of introduction of the atmospheric pressure to the atmospheric pressure chamber 22e). Thus, the force F2 acting on the power piston 22b does not build up or increase further. That is, until the pressure in the atmospheric pressure chamber 22e reaches the atmospheric pressure, the vacuum booster 22 outputs a resultant force which is made by adding the force F2 acting on the power piston 22b to the manipulation force F1 of the brake pedal 21. On the other hand, at the time of reaching or thereafter, the vacuum booster 22 outputs another resultant force which is made by adding to the force F2 at the time of reaching an increment of the manipulation force F1 acting on the brake pedal 21. The time when the pressure in the atmospheric pressure chamber 22e reaches the atmospheric pressure is the time when the vacuum booster 22 reaches its boosting limit. In other words, the boosting limit is meant as a boundary or limitation beyond which the vacuum booster 22 can no longer perform its boosting operation, and is determined in dependence on the atmospheric pressure and the vacuum pressure being the pressure in the vacuum pressure chamber 22d.

Thus, by varying the manipulation force F1 with an arbitrary vacuum pressure maintained, there can be acquired a master cylinder pressure corresponding to the boosting limit of the vacuum booster 22, and thus, a boosting limit pressure at the vacuum pressure can be calculated. For example, the vacuum pressure (the vacuum pressure for attaining a target brake pressure in the brake system in the present embodiment) has a boosting limit pressure Pmc(n) at Pnn, another boosting limit pressure Pmc(3) at Pn3 which is lower than Pnn, another boosting limit pressure Pmc(2) at Pn2 which is lower than Pn3, and another boosting limit pressure Pmc(1) at Pn1 which is lower than Pn2. It is to be noted that when the vacuum pressure is 0 (zero), the boosting limit does not take place, and the manipulation force F1 as it is becomes the master cylinder pressure. Thus, no boosting limit pressure exists, so that the boosting cannot be carried out in all the ranges.

The vacuum pressures and the boosting limit pressures calculated in this manner regarding the respective vacuum pressures are correlated on a one-to-one basis, and thus, the vacuum-boosting limit pressure map shown in FIG. 4 can be derived from a plurality of correlated data (vacuum pressures and boosting limit pressures). It is to be noted that term "boosting limit pressure" means a master cylinder pressure which the master cylinder 23 has therein when the vacuum booster 22 reaches the boosting limit by varying the manipulation force F1 at each of arbitrary vacuum pressures.

Further, the brake ECU 26 is provided with a boosting limit judgment pressure calculation section (boosting limit judgment pressure calculation means) 26d for calculating as boosting limit judgment pressure the boosting limit pressure which is derived from the vacuum pressure acquired by the vacuum pressure acquisition section 26a and the vacuum-boosting limit pressure map stored in the first storage section 26c. The boosting limit judgment pressure is a judgment value which is used in judging based on the master cylinder pressure whether to start the boost control or not.

Further, the brake ECU 26 is provided with a boost control section (boost control means) 26e which performs the boost control as follows. That is, when the master cylinder pressure acquired by the master cylinder pressure acquisition section 26b is equal to or higher than the boosting limit judgment pressure which is calculated by the boosting limit judgment pressure calculation section 26d, the boost control section 26e drives the pumps 44a, 54a to build up brake pressures built by the operations of the pumps 44a, 54a, adds each of the built-up pressures to the master cylinder pressure built up in dependence on the manipulation of the brake pedal 21 and to supply the sum of the pressure addition to each of the wheel cylinders WC. On the contrary, when the master cylinder pressure is lower than the boosting limit judgment pressure, the boost control section 26e stops the driving of the pumps 44a, 54a**.

Figure 6:
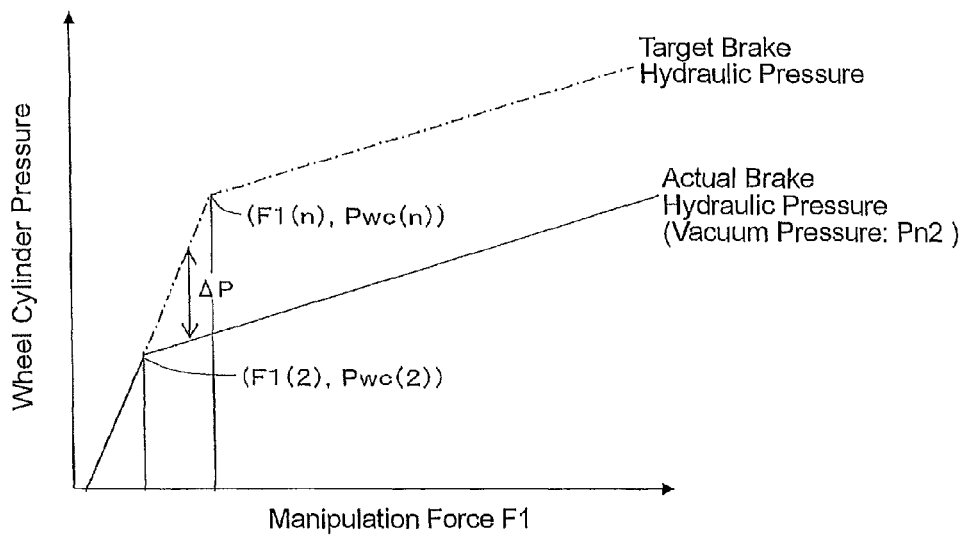
FIG. 6 is a graph showing a relation between brake pedal manipulation force and wheel cylinder pressure with respect to each of an actual brake hydraulic pressure and a target brake hydraulic pressure and also showing the difference as target pressure difference ΔP between the actual brake hydraulic pressure and the target brake hydraulic pressure.

Between the manipulation force F1 of the brake pedal 21 and the wheel cylinder pressure (master cylinder pressure), there is a relation shown in FIG. 6. Where the supply of the vacuum pressure to the vacuum booster 22 is sufficient, the target brake hydraulic pressure of the wheel cylinder WC represents the property shown by the one-dot-chain line in FIG. 6. Here, "where the supply of the vacuum pressure is sufficient (where the supply is proper)" means that the value of the vacuum pressure (negative pressure) being supplied is larger than a predetermined value (i.e., the absolute value of the negative or minus pressure is large). The predetermined value is a smaller value in absolute value than the maximum value of the vacuum pressure generated in the intake manifold 11a of the engine 11**. For example, the predetermined value is set to a value which is slightly lower than the vacuum pressure value in an idling state that the rotational speed of the engine is lowest, or the like.

As mentioned earlier, the target brake hydraulic pressure has a boosting limit. The boosting limit in this case is Pwc(n) the wheel cylinder pressure (=master cylinder pressure) has when the manipulation force F1 attains F1(n). On the other hand, when the boosting limit is lowered as a result that the vacuum pressure in the vacuum booster 22 goes down (to Pn2) in comparison with the aforementioned case, an actual brake hydraulic pressure which is supplied to the wheel cylinders WC goes down as indicated by the solid line in FIG. 6. The boosting limit in the latter case is Pwc(2) that the wheel cylinder pressure (=master cylinder pressure) has to be lower than Pwc(n) when the manipulation force F1 is F1(2) smaller than F1(n). The master cylinder 23 outputs a base hydraulic pressure and a boosting hydraulic pressure while the brake pedal 21** is being manipulated. The boosting hydraulic pressure is built up by a desired value (i.e., a boosting hydraulic pressure depending on the target brake hydraulic pressure) where the manipulation force F1 is smaller than F1(2) corresponding to the boosting limit, but is built up only by a smaller value than the desired value where the manipulation force F1 is larger than F1(2). Thus, there occurs a deficiency or shortfall of pressure (i.e., the difference between a desired boosting hydraulic pressure and an actual boosting hydraulic pressure). To avoid the situation, where the manipulation force F1 is larger than F1(2), the shortfall of the boosting hydraulic pressure is defined as a target differential pressure ΔP, and the pump-built additional or controlled hydraulic pressure is used to compensate for the shortfall of the boosting hydraulic pressure.

Figure 7:
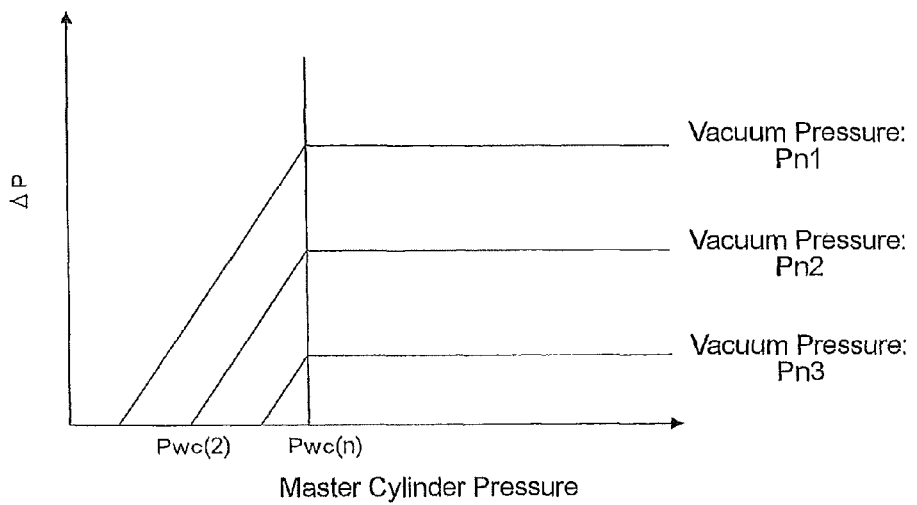
FIG. 7 is a graph showing relations between the master cylinder pressures and the target pressure differences ΔP at various levels of the vacuum pressure.

FIG. 7 shows a relation between actual master cylinder pressure and target differential pressure ΔP at each of various vacuum pressures. As mentioned earlier, the target differential pressure ΔP is the difference between a target brake hydraulic pressure and an actual master cylinder pressure in a given vacuum pressure. In the relation shown in FIG. 7, until the master cylinder pressure (wheel cylinder pressure) reaches a value (Pwc(2) at vacuum pressure Pn2) which corresponds to the boosting limit of the actual brake hydraulic pressure relative to a given vacuum pressure, the target differential pressure ΔP remains zero because the boosting can be given by the booster 22. Until the master cylinder pressure (wheel cylinder pressure) reaches a value Pwc(n) corresponding to the boosting limit of the target brake hydraulic pressure after reaching the value (Pwc(2) at vacuum pressure Pn2) corresponding to the boosting limit of the actual brake hydraulic pressure relative to the given vacuum pressure, the target differential pressure ΔP increases in proportion to an increase in the master cylinder pressure. Then, the target differential pressure ΔP becomes a constant value after the master cylinder pressure (wheel cylinder pressure) attains the value Pwc(n) corresponding to the boosting limit of the target brake hydraulic pressure.

Further, the target differential pressure ΔP relative to the master cylinder pressure Wwc(n) which corresponds to the boosting limit at the target brake hydraulic pressure becomes larger as the vacuum pressure decreases. This is because the shortfall of the boosting hydraulic pressure becomes larger as the vacuum pressure becomes lower, so that there arises a necessity to heighten the controlled hydraulic pressure which compensates for the shortfall. In FIG. 7, where the vacuum pressure is Pn1 smaller than Pn2, the relation at this case (the relation between the master cylinder pressure and the target differential pressure ΔP) is positioned at an upper side than the relation where the vacuum pressure is Pn2. Where the vacuum pressure is Pn3 smaller than Pn2, the relation at this case is positioned at an lower side than the relation where the vacuum pressure is Pn2. Further, where the master cylinder pressures is lower than the Pwc(n), the respective vacuum pressures have the same gradient in the increase rate of the target differential pressure ΔP relative to the master cylinder pressure.

The relation illustrated in FIG. 7 is set to realize the relation that after the vacuum booster 22 reaches the boosting limit, the wheel cylinder pressure linearly increases relative to the manipulation force F1 at the same gradient as it does before the vacuum booster 22 reaches the boosting limit. Further, the relation illustrated in FIG. 7 is determined based on the values given in design and is stored in the brake ECU 26 in advance.

Further, the brake ECU 26 is provided with a returning start judgment section (returning start judgment means) 26f for judging whether the returning of the brake pedal 21 has been started or not. As well-known in the art, the returning of the brake pedal 21 is brought about by a spring (not shown) which urges the brake pedal 21 to come back toward a home position. That is, when the driver draws his/her braking foot, the brake pedal 21 comes back toward its home position by means of the resilient force of the spring, and the return speed of the brake pedal 21 depends on the motion of the driver's braking foot. For example, when the driver slowly draws his/her braking foot on the brake pedal 21, the same is returned slowly to follow the motion of the braking foot. However, when the driver releases the brake pedal 21 (i.e., when the driver takes the braking foot away from the brake pedal 21), the same is returned quickly by means of the resilient force of the spring. When detecting that the change speed in the master cylinder pressure from the master cylinder pressure acquisition section 26b becomes smaller than a first change speed (a negative value or zero), the returning start judgment section 26f detects that the returning of the brake pedal 21 has begun. When detecting that the change speed of the master cylinder pressure becomes higher than a second change speed (a positive value) which is higher than the first change speed, the brake ECU 26 detects that the stepping or manipulation of the brake pedal 21 has begun. For the purpose of these judgments, instead of the master cylinder pressure, there may be used the stroke amount of the brake pedal 21 given from the pedal stroke sensor 21*a*.

Further, the brake ECU 26 is provided with a vacuum pressure judgment section (vacuum pressure judgment means) 26*g* for judging whether the vacuum pressure detected by the vacuum pressure sensor 22*f*2 is stable or not. The vacuum pressure judgment section 26*g* judges the vacuum pressure to be stable (i.e., in the stable state) if the detected vacuum pressure is within a predetermined width of fluctuation (for example, where the change rate of the vacuum pressure remains in a predetermined range of the change rate) and if such state continues for a predetermined time period. On the other hand, if the vacuum pressure is out of the predetermined width of fluctuation (e.g., as is the case that the brake pedal 21 begins to be stepped on) or if the vacuum pressure is within the predetermined width of fluctuation but such state does not continue for the predetermined time period, the vacuum pressure judgment section 26*g* judges that the vacuum pressure is out of the stable state.

Further, the brake ECU 26 is provided with a first judgment value derivation and storage section (first judgment value derivation and storage means) 26*h* which, if predetermined conditions are satisfied during the driving of the pumps 44*a*, 54*a* by the boost control section 26*e* (i.e., during the boost control held on), derives and stores as first judgment value a boosting limit judgment pressure calculated by the boosting limit judgment pressure calculation section 26*d* at the time of the predetermined conditions satisfied. That is, upon receipt of the judgment results from the returning start judgment section 26*f* and the vacuum pressure judgment section 26*g*, the first judgment value derivation and storage section 26*h* judges based on the judgment results whether the predetermined conditions are satisfied or not, and if the predetermined conditions are satisfied, then derives and stores as the first judgment value the boosting limit judgment pressure which the boosting limit judgment pressure calculation section 26*d* calculates at the time of the predetermined conditions satisfied.

Specifically, one of the predetermined conditions is that the vacuum pressure in the vacuum pressure chamber 22*d* of the vacuum booster 22 is in a stable state that it is in the predetermined range, before the returning start judgment section 26*f* judges that the returning of the brake pedal 21 has begun. The other of the predetermined conditions is that the returning start judgment section 26*f* judges that the returning of the brake pedal 21 has begun. Instead, the other predetermined condition may be that the time at which it is judged whether the aforementioned stable state has attained or not is right before or a right after the time at which the returning start judgment section 26*f* judges that the returning of the brake pedal 21 has begun.

Further, the brake ECU 26 is provided with a second judgment value derivation section (second judgment value derivation means) 26*i* for deriving a second judgment value being a boosting limit judgment pressure which is used during the stepping manipulation of the brake pedal 21 (except during the release of the stepping or the returning manipulation). That is, upon receipt of the judgment results from the returning start judgment section 26*f* and the vacuum pressure judgment section 26*g*, the second judgment value derivation section 26*i* also derives as the second judgment value the boosting limit judgment pressure calculated by the boosting limit judgment pressure calculation section 26*d*, if the predetermined conditions are not satisfied. Further, after the first judgment value derivation and storage section 26*h* stores the first judgment value, the second judgment value derivation section 26*i* derives the second judgment value regardless of the judgment results from the returning start judgment section 26*f* and the vacuum pressure judgment section 26*g*.

(Operation)

Figure 8:
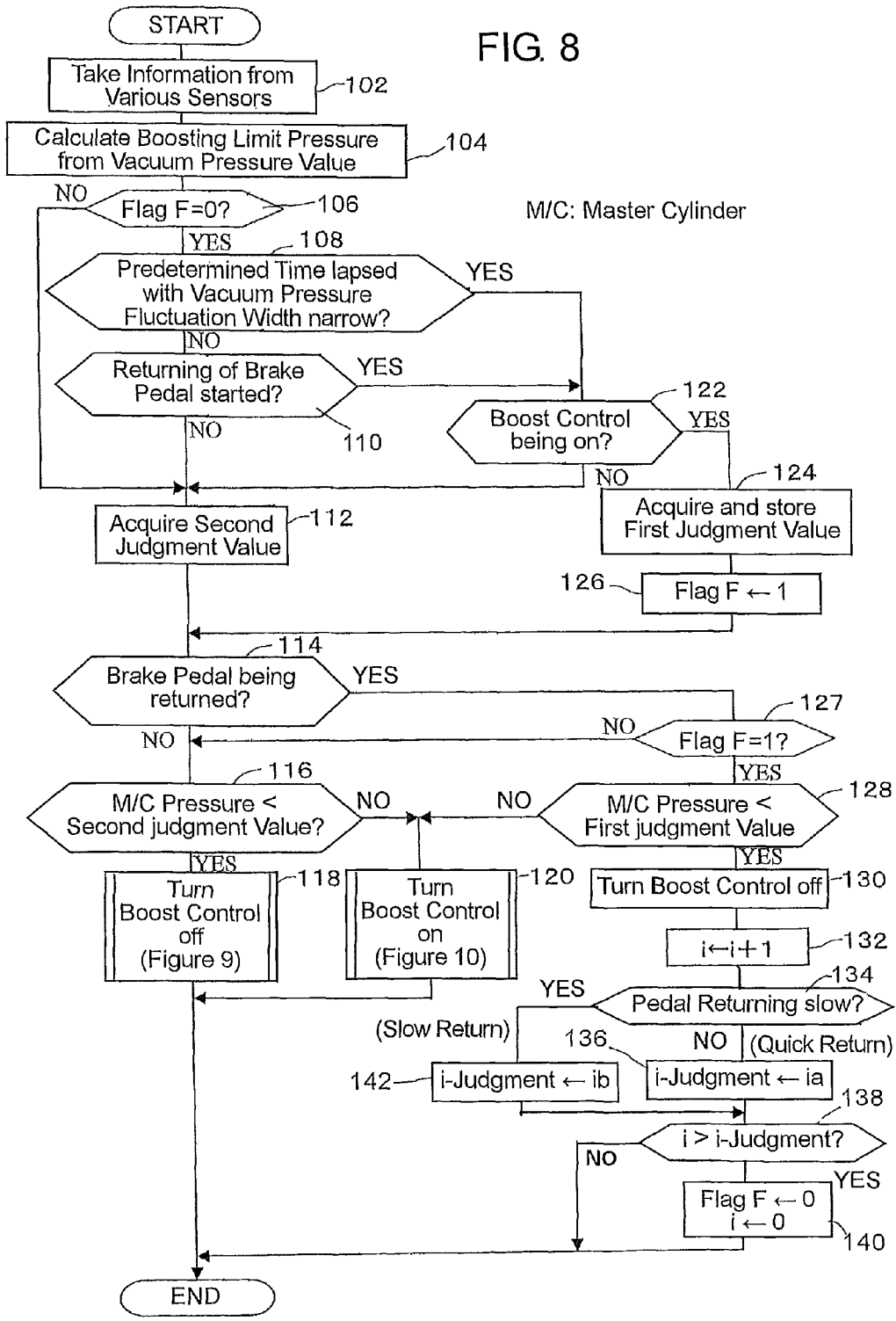
FIG. 8 is a flow chart of a control program for the boost control executed by the control device (brake ECU) shown in FIG. 1.
Figure 9:
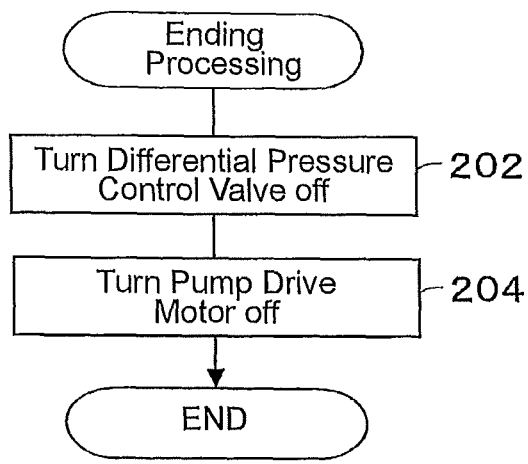
FIG. 9 is a flow chart of an ending processing routine shown in FIG. 8.

Next, the operation of the hydraulic brake system constructed as described above will be described with reference to flow charts shown in FIGS. 8 to 10. When an ignition switch (not shown) is in the on state for example, the brake ECU 26 executes the program corresponding to the flow chart shown in FIG. 8 at a predetermined short time interval (e.g., 10 millisecond interval). When the flow chart shown in FIG. 8 is started at the very beginning, a flag F and a counter (i) are cleared to zero (0).

The brake ECU 26 takes thereinto (acquires) information from the aforementioned various sensors (step 102). At this time, various signals are taken thereinto from the vacuum pressure sensor 22*f*2, the master cylinder pressure sensor 25*a*1, the wheel speed sensors Sfl, Sfr, Srl, Srr, and the pedal stroke sensor 21*a*. Then, the brake ECU 26 calculates as the boosting limit judgment pressure a boosting limit pressure which is obtained from the vacuum pressure acquired at step 102 and the vacuum-boosting limit pressure map stored in the first storage section 26*c* (step 104).

Then, the brake ECU 26 judges at step 106 whether the flag F is 0 or 1. The flag F is a flag for representing whether the first judgment value has been stored or not. The flag F represents that the storage has not been made when being 0 and also represent that the storage has been made when being 1. When the flow chart shown in FIG. 8 is executed at the very first time after a power supply to the system, the flag is 0, and thus, the brake ECU 26 makes a judgment of "YES" at step 106. The brake ECU 26 repeats making a judgment of "YES" until 1 is set in the Flag F (until the first judgment value is derived and stored).

If the first judgment value has been stored, on the contrary, the flag F remains 1 until the boost control being on (i.e., under execution) is turned off (i.e., out of execution), and thus, a judgment of "NO" is made at step 106 to advance the program p to step 112. Thus, the processing (steps 108, 110, 122) for judging whether the predetermined conditions for deriving and storing the first judgment value have been satisfied or not can be omitted from being executed.

Unless the first judgment value has been derived and stored, the brake ECU 26 advances the program to step 108 and those subsequent thereto and judges whether the predetermined conditions for deriving and storing the first judgment value have been satisfied or not during the driving of the pumps 44*a*, 54*a* by the boost control section 26*e* (i.e., during the boost control being on).

Step 108 involves the processing for judging one of the aforementioned predetermined conditions, that is, judging whether the vacuum pressure in the vacuum pressure chamber 22*d* of the vacuum booster 22 has come within the predetermined range and is stable before the returning start judgment section 26*f* judges that the returning of the brake pedal 21 has been started. At step 108, if the vacuum pressure detected by the vacuum pressure sensor 22*f*2 has come within the predetermined range of fluctuation (e.g., if it has come within a range of the maximum dispersion obtained through experiments with the pedal (brake pedal) 21 being in the hold state that the throttle opening is kept constant), and if the state that the vacuum pressure remains within the predetermined range of fluctuation continues for a predetermined time period, it is judged that the vacuum pressure is stable or in the stable state (i.e., a judgment of "YES" is made). If the vacuum pressure has not come within the predetermined range of fluctuation (e.g., at the time of the stepping start of the brake pedal 21) or if the state that the vacuum pressure remains within the predetermined range of fluctuation does not continue for the predetermined time period, it is judged that the vacuum pressure is not stable (i.e., a judgment of "NO" is made). The aforementioned stable state can be defined to be the state that the vacuum pressure in the vacuum pressure chamber 22d of the vacuum booster 22 has the same value as the state that the brake pedal 21 is not being stepped.

Further, step 110 involves judging the aforementioned other predetermined condition, that is, judging whether or not the returning start judgment section 26f judges that the returning of the brake pedal 21 has been started. At step 110, when the change speed in the master cylinder pressure from the master cylinder pressure acquisition section 26b is detected to have become lower than the first change speed (a minus value or zero), the returning of the brake pedal 21 is judged to have been started (i.e., a judgment of "YES" is made). If not so, the returning of the brake pedal 21 is judged not to have been started (i.e., a judgment of "NO" is made).

If either one of the predetermined conditions is judged to be satisfied and if the boost control is on ("YES" at step 122), the brake ECU 26 derives and stores the first judgment value (step 124). If the boost control is not on (the boost control is off) though either one of the predetermined conditions is judged to be satisfied, or if neither of the predetermined conditions is judged to be satisfied, the brake ECU 26 derives the second judgment value without deriving and storing the first judgment value (step 112).

If the predetermined conditions are satisfied during the boost control being on, the brake ECU 26 at step 124 derives and stores as the first judgment value a boosting limit judgment pressure which is calculated by the boosting limit judgment pressure calculation section 26d at the time of the satisfaction confirmed. That is, upon receipt of the judgment results from the steps 108 and 110, the brake ECU 26 judges based on the judgment results whether the predetermined conditions have been satisfied or not, and if the predetermined conditions have been satisfied, derives and stores as the first judgment value the boosting limit judgment pressure which has been calculated this time at step 104 at the time of the satisfaction of the predetermined conditions. Then, the brake ECU 26 sets the flag F to 1 at step 126.

When confirming that the predetermined conditions have not been satisfied, the brake ECU 26 at step 112 acquires as the second judgment value the boosting limit judgment pressure presently calculated this time at step 104. Further, once having stored the first judgment value at step 124, the brake ECU 26 acquires the second judgment value without taking into account the result of the judgment regarding whether the predetermined conditions have been satisfied or not.

In this way, the brake ECU 26 derives the first judgment value which is to be used as the boosting limit judgment pressure from the time when the stepping of the brake pedal 21 is started to the time when the stepping is released (i.e., when the returning of the brake pedal 21 is started), and also derives the second judgment value which is to be used as the boosting limit judgment pressure from the time of the stepping release (the starting of the brake pedal returning) to the time when the braking is terminated.

Thereafter, the brake ECU 26 executes the boost control using the first judgment value and the second judgment value derived in this way, at step 114 and those steps subsequent thereto. First of all, description will be made regarding the operation which is performed from the time when the stepping of the brake pedal 21 is started to the time when the stepping is released (the brake pedal returning is started).

When the stepping of the brake pedal 21 is started, the brake ECU 26 makes a judgment of "NO" at step 114. At step 114, the brake ECU 26 judges whether the brake pedal 21 is being returned or not. For example, if the change speed of the master cylinder pressure from the master cylinder pressure acquisition section 26b is lower than the first change speed (minus value or zero), the brake pedal 21 is judged to be being returned (a judgment of "YES" is made). If not so, the brake pedal 21 is judged not to be being returned (a judgment of "NO" is made).

During the period from the time when the stepping of the brake pedal 21 is started to the time when the stepping is released (when the returning of the brake pedal 21 is started), the brake ECU 26 judges whether the vacuum booster 22 is in the state that it is able to perform the boosting (step 116). Concretely, the brake ECU 26 judges that the vacuum booster 22 is in the state wherein the boosting is possible, if the master cylinder pressure acquired at step 102 is lower than the second judgment value calculated at step 112 (makes a judgment of "YES"), but judges that the vacuum booster 22 is in the state wherein it is unable to perform the boosting, if the master cylinder pressure is equal to or greater than the second judgment value (makes a judgment of "NO"). Here, the state that the boosting is possible means the state in which the boosting is possible by the action of the vacuum pressure being supplied to the vacuum booster 22.

If the vacuum booster 22 is in the state that the boosting is possible, the brake ECU 26 at step 116 makes a judgment of "YES" and turns the boost control off (i.e., executes an ending processing) at step 118. More specifically, the brake ECU 26 at step 118 executes the ending processing for ending the pressure increase control (the boost control) in accordance with a subroutine of a flow chart shown in FIG. 9. In this ending subroutine, an OFF signal is outputted to the differential pressure control valve 41 (or/and 51) at step 202 to turn the differential pressure control valve 41 (or/and 51) off (into the full-open state), and an OFF signal is also outputted to the pump drive motor 44b to turn the same off at step 204, whereby the driving of the pump 44a (and/or 54a) is stopped. By the execution of this step, one-time execution of the ending processing is terminated, whereby one-time execution of the control routine shown in FIG. 8 is also terminated. It is to be noted that the ending processing for ending the pressure increase control (boost control) not only has a function as the ending processing for ending the pressure increase control, but also has another function as an ordinary brake processing for the period from the time when the stepping of the brake pedal 21 is started to the time when the boosting limit is reached. The ordinary brake processing is to keep the differential pressure control valve 41 (or/and 51) in the full-open state that no pressure difference is generated thereacross, in order to supply the hydraulic pressure from the master cylinder 23 to the wheel cylinders WC** without changing the hydraulic pressure in magnitude.

On the other hand, if the vacuum booster 22 is not in the state that the boosting is possible, the brake ECU 26 makes a judgment of "NO" at step 116, and turns the boost control on (step 120). The boost control is the control which drives the pumps 44a, 54a to build up an additional brake hydraulic pressure and which adds the additional brake hydraulic pressure to the master cylinder pressure built up in dependence on the manipulation of the brake pedal 21, so as to supply the wheel cylinders WC** with a target brake hydraulic pressure depending on the manipulation of the brake pedal 21 (boost control means).

Figure 10:
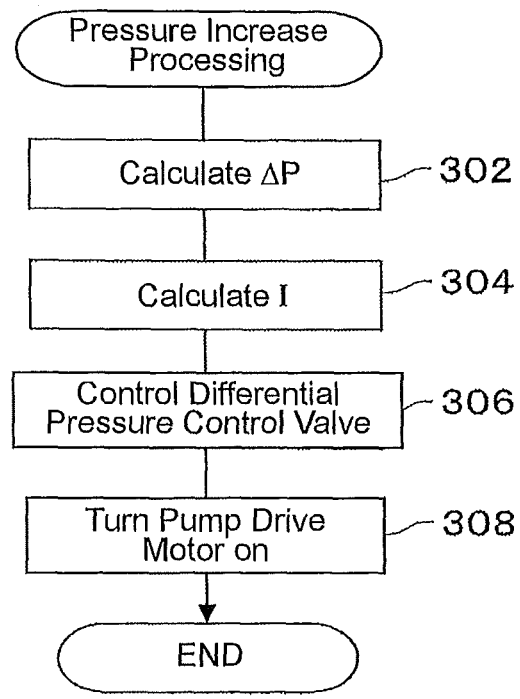
FIG. 10 is a flow chart of a pressure increase control routine shown in FIG. 8.

Specifically, the brake ECU 26 executes the boost control in accordance with a subroutine represented by a flow chart shown in FIG. 10. At step 302, the brake ECU 26 calculates, based on present values of the master cylinder pressure and the vacuum pressure, an additional hydraulic pressure to be increased to a present master cylinder pressure, that is, a target differential pressure $\Delta P$ which is the difference between a target brake hydraulic pressure of each wheel cylinder WC** and a wheel cylinder pressure (=master cylinder pressure) being actually generated.

Then, the brake ECU 26 determines a current value I to be supplied to the solenoid of the differential pressure control valve 41 (or/and 51), in dependence on the determined target differential pressure $\Delta P$ (step 304). Since the relation between the target differential pressure $\Delta P$ and the solenoid current value I is stored in the storage section (the ROM) of the brake ECU 26, the solenoid current value I corresponding to the target differential pressure $\Delta P$ is determined by reference to the stored relation. Then, the brake ECU 26 controls the differential pressure control valve 41 (or/and 51) to generate the target differential pressure $\Delta P$ by supplying the differential pressure control valve 41 (or/and 51) with a current of the determined solenoid current value I (step 306).

Thereafter, the brake ECU 26 outputs a drive signal to the pump drive motor 44b to turn the same on (step 308). As a consequence, the pump 44a (or/and 54a) draws the operating fluid from the pressure regulation reservoir 44c (or/and 54c) and discharges the operating fluid to each wheel cylinder WC, whereby a hydraulic pressure (resultant hydraulic pressure) which is higher by the target differential pressure $\Delta P$ than the master cylinder pressure is generated in each wheel cylinder WC. By this processing, one-time execution of the pressure increase control routine (boost control routine) is terminated, whereby one-time execution of the control routine (main routine) shown in FIG. 8 is also terminated.

Next, description will be made regarding the operation which is performed from the time when the stepping is released (i.e., the returning of the brake pedal 21 is started) to the time when the braking operation is terminated. At the time of the stepping release or the brake pedal returning, the brake ECU 26 makes a judgment of "YES" at step 114. Then, the brake ECU 26 makes a judgment of "YES" at step 127 which is a step of judging whether the flag F is 1 or not, because the flag has been set to 1. Thus, the first judgment value is used until a predetermined time corresponding to a judgment value (ia) lapses after the boost control begins to be turned off with the brake pedal 21 being stepped, whereas the second judgment value is used after the lapse of the predetermined time.

Then, similarly to step 116, the brake ECU 26 judges whether the vacuum booster 22 is in the state that the boosting is possible or not (step 128). Concretely, the brake ECU 26 judges that the vacuum booster 22 is in the state that the boosting is possible, if the master cylinder pressure having been acquired at step 102 is lower than the first judgment value having been stored at step 124 (i.e., makes a judgment of "YES"), but judges that the vacuum booster 22 is not in the state that the boosting is possible, if the master cylinder pressure is equal to or higher than the first judgment value (i.e., makes a judgment of "NO").

If the vacuum booster 22 is not in the state that the boosting is possible, the brake ECU 26 makes a judgment of "NO" at step 128 and turns the boost control on (step 120) as does for the foregoing period from the time when the stepping of the brake pedal 21 is started to the time when the stepping is released (the returning of the brake pedal 21 is started).

If the vacuum booster 22 is in the state that the boosting is possible, on the contrary, the brake ECU makes a judgment of "YES" at step 128 and turns the boost control off (step 130) as does for the foregoing period from the time when the stepping of the brake pedal 21 is started to the time when the stepping is released (the returning of the brake pedal 21 is started). In this case, a processing is executed for maintaining the boosting limit judgment pressure as the first judgment value until a predetermined period lapses following the time at which the boost control is turned off. This is to maintain (fix) the boosting limit judgment pressure at a predetermined value until the fluctuation which occurs in the vacuum pressure in releasing the brake pedal 21 calms down. As a result, it becomes possible to suppress the fluctuation of the boosting limit judgment pressure which would otherwise fluctuate with the change in the vacuum pressure.

Specifically, the brake ECU 26 at step 132 increments the counter (i) by one. Then, the brake ECU 26 ate step 134 judges the quickness in the return speed of the brake pedal 21 as follows. That is, if the change speed in the master cylinder pressure which is acquired from the master cylinder pressure acquisition section 26b is lower than a third change speed which is further lower than the first change speed (i.e., if the reduction in the master cylinder pressure is acuter than the gradient corresponding to the third change speed), the brake ECU 26 judges the returning of the brake pedal 12 as quick return (i.e., makes a judgment of "NO"). If the change speed is higher than the third change speed (i.e., if the reduction in the master cylinder pressure is gentler than the gradient corresponding to the third change speed), the brake ECU 26 judges the returning of the brake pedal 12 as slow return (i.e., makes a judgment of "YES").

The brake ECU 26 sets an i-judgment to a judgment value ia (step 136) when judging the returning of the brake pedal 12 as quick return, whereas it sets the i-judgment to another judgment value ib (step 142) when judging the returning of the brake pedal 12 as slow return. The judgment value ib is set to a larger value than the judgment value ia. It is desired that both of the judgment values ia and ib be set so that the fluctuation in the vacuum pressure generated in returning the brake pedal 21 does not have any influence on the on/off switching of the boost control. It is also desired that the judgment values ia and ib be set to time periods which make the master cylinder pressure absolutely lower than the second judgment value calculated from the vacuum pressure.

If the present count value (i) calculated earlier at step 132 is smaller than the i-judgment (judgment value (ia) or (ib)) having been set earlier, the brake ECU 26 makes a judgment of "NO" at step 138, and terminates one-time execution of the present control routine. If the counter value (i) is larger than the i-judgment, on the contrary, the brake ECU 26 makes a judgment of "YES" at step 138, and clears the flag F and the counter value (i) to zero before terminating one-time execution of the present control routine.

As a consequence, when the brake pedal 21 is being returned quickly, the brake ECU 26 executes the processing for maintaining the boosting limit judgment pressure at the first judgment value until a relatively short predetermined time period lapses from the time when the boost control is turned off. On the other hand, when the brake pedal 21 is being returned slowly, the brake ECU 26 executes the processing for maintaining the boosting limit judgment pressure at the first judgment value until a relatively long predetermined time period lapses from the time when the boost control is turned off.

Figure 11:
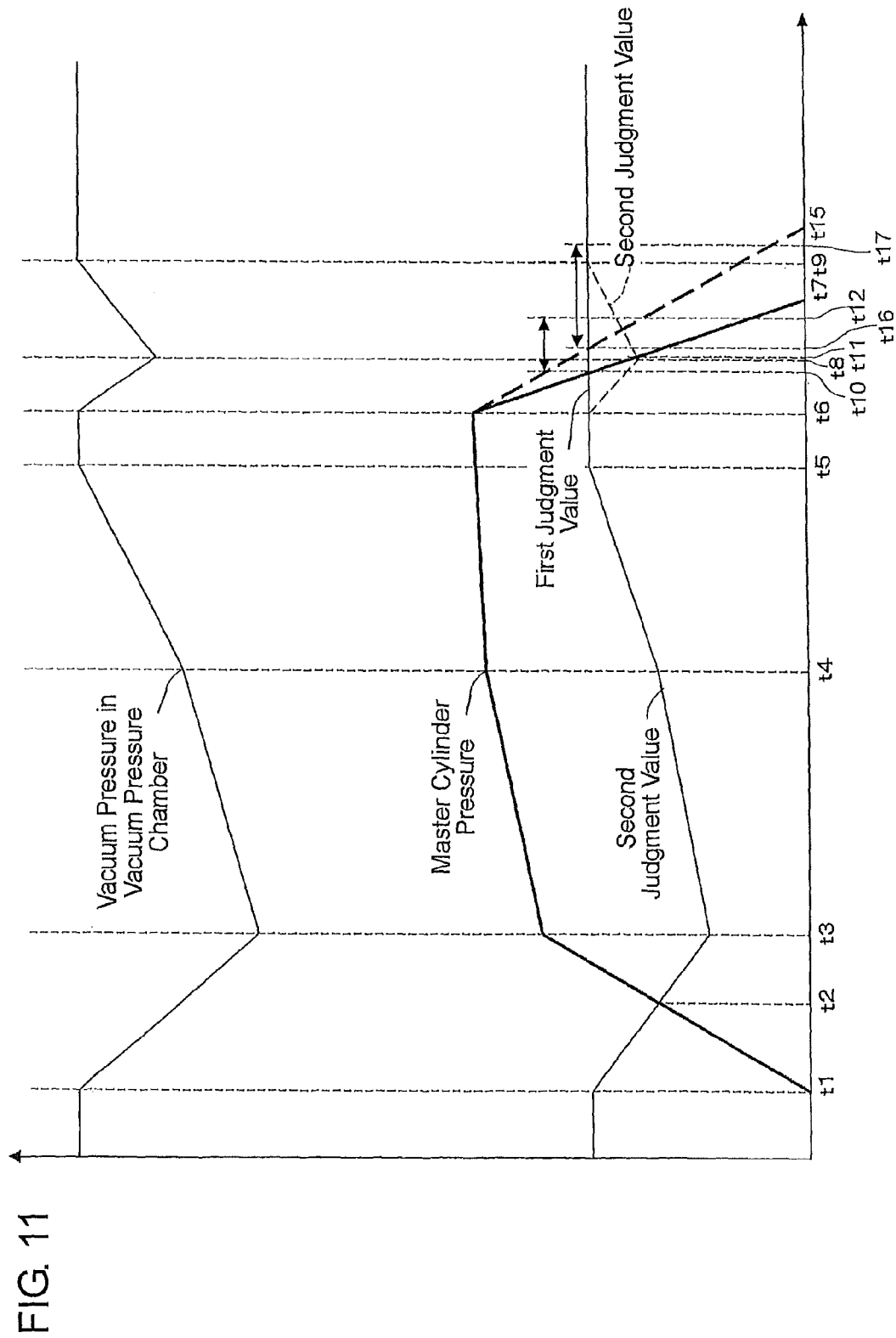
FIG. 11 is a time chart for explaining the operation executed by the control device in accordance with the control program shown in FIG. 8.

Further, the operation in the case that the brake pedal 21 is returned quickly will be described with reference to a time chart shown in FIG. 11. Description will be made regarding the operation which begins from the time (time t1) at which the stepping of the brake pedal 21 is started. The graph shown in FIG. 11 shows the vacuum pressure in the vacuum pressure chamber 22d at the upper row and the boosting limit judgment pressures (the first and second judgment values) calculated based on the vacuum pressure and the master cylinder pressure at the lower row.

The second judgment value is used as the boosting limit judgment pressure for the period from the stepping start time (time t1) of the brake pedal 21 to the stepping release time (brake pedal returning start time: time t6). This is because the brake ECU 26 makes a judgment of "NO" at each of steps 108, 110 and calculates the boosting limit pressure presently calculated at step 104 as the second judgment value (step 112).

On the other hand, the first judgment value is used as the boosting limit judgment pressure for the period from the stepping release time (brake pedal returning start time: time t6) to the time (time t12) at which a predetermined time period lapses from the time (time t10) at which the boost control is turned off. This is because the brake ECU 26 makes a judgment of "YES" at either of the steps 108, 110 and also at step 122, calculates and stores the boosting limit pressure presently calculated (at step 104) as the first judgment value (step 124) and clears the flag F to zero (step 140) at the time (time t12) when a predetermined time period lapses from the time (time t10: step 130) at which the boost control is turned off.

Until the brake pedal 21 is stepped (until time t1), the master cylinder pressure remains zero, and the vacuum pressure in the vacuum pressure chamber 22d remains same as the vacuum pressure in the intake manifold 11a of the engine 11. When the stepping of the brake pedal 21 is started at time t1, the master cylinder pressure begins to increase. With this, the power piston 22a which is boosted as a result of the atmospheric pressure chamber 22e brought into communication with the atmosphere is moved toward the master cylinder 23 side, and thus, the vacuum pressure in the vacuum pressure chamber 22d goes down.

In this way, at time t1 and thereafter, if the master cylinder pressure is lower than the second judgment value under the circumstance that the master cylinder pressure increases and that the vacuum pressure reduces, the boost control remains off (i.e., the pumps 44a, 54a remains stopped) (i.e., the brake ECU 26 makes a judgment of "YES" at step 116 and executes the processing at step 118).

When the master cylinder pressure becomes higher than the second judgment value at time t2, the brake ECU 26 makes a judgment of "NO" at step 116 and turns the boost control on (drives the pumps 44a, 54a at step 120).

Then, when the vacuum booster 22 reaches the boosting limit at time t3, the vacuum booster 22 becomes unable to perform the boosting (becomes unable to add the boosting pressure), so that the master cylinder pressure increases based on the base hydraulic pressure only. The increase rate at this time is smaller than the increase rate until time t3. On the other hand, the vacuum pressure in the vacuum pressure chamber 22d turns from decrease until time t3 into increase. This is because the increase of the vacuum pressure supplied from a vacuum pressure supply (i.e., the manifold 11a of the engine 11) exceeds in comparison with the decrease of the vacuum pressure which is caused by the change in volume change rate of the vacuum pressure chamber 22d.

Then, when it becomes unable at time t4 to step down the brake pedal 21 further, the master cylinder pressure is stopped from increasing further and is held to change hardly (i.e., at an approximately constant pressure). On the other hand, the vacuum pressure in the vacuum pressure chamber 22d increases as increased after time t3, and the increase rate is larger than that until time t4. This is because the decrease in the vacuum pressure which is caused by the change in the volume change rate of the vacuum pressure chamber 22d becomes null, but the increase rate of the vacuum pressure supplied from the vacuum pressure supply becomes large.

Then, the vacuum pressure in the vacuum pressure chamber 22d further increases and finally becomes the same as the vacuum pressure in the vacuum pressure supply at time t5.

Then, when the master cylinder pressure begins to decrease at time t6 as the returning or release of the brake pedal 21 is started. Thereafter, when the returning or release of the brake pedal 21 ends, the master cylinder pressure goes down to zero at time t7. On the other hand, when the returning or release of the brake pedal 21 is started, the atmospheric pressure chamber 22e is blocked from the atmosphere and is brought into communication with the vacuum pressure chamber 22d. That is, the air remaining in the atmospheric pressure chamber 22e flows into the vacuum pressure chamber 22d, and the vacuum pressure in the vacuum pressure chamber 22d begins to go down toward the atmospheric pressure slightly later than the master cylinder pressure begins to decrease. Thereafter, by being supplied with vacuum pressure from the vacuum pressure supply (i.e., because the vacuum pressure chamber 22d is subjected to vacuum by the inlet manifold 11a), the vacuum pressure going down in the vacuum pressure chamber 22d turns to increase (time t8) and finally reaches the same pressure as the vacuum pressure in the vacuum pressure supply (time t9).

In the present embodiment, time t7 at which the master cylinder pressure goes down to zero is behind time t8 at which the vacuum pressure turns from decrease into increase but is ahead of time t9 at which the vacuum pressure becomes the same pressure as the vacuum pressure in the vacuum pressure supply. It may occur that time t7 at which the master cylinder pressure goes down to zero becomes ahead of time t8 at which the vacuum pressure turns from decrease into increase, and it also may occur that the time t7 becomes behind time t9 at which the vacuum pressure becomes the same pressure as the vacuum pressure in the vacuum pressure supply. This depends on the relation between the decrease speed of the master cylinder pressure and the vacuum pressure in the vacuum pressure chamber 22d.

After time t6, the first judgment value is used as the boosting limit judgment pressure until the second judgment value is used again (i.e., until time t12). Until the master cylinder pressure becomes lower than the first judgment value in the return motion of the brake pedal 21 (i.e., from time t6 to time t10), the brake ECU 26 repeats making a judgment of "NO" at step 116 and continues to hold the boost control on (step 120). Then, as the master cylinder pressure becomes lower than the first judgment value (time t10), the brake ECU 26 makes a judgment of "YES" at step 128 and turns the boost control off (step 130).

Herein, description will be made regarding the operation in the case that the second judgment value is used as the boosting limit judgment pressure after time t6. Until the master cylinder pressure becomes lower than the second judgment value (indicated by the broken line in FIG. 11) in the return motion of the brake pedal 12 (i.e., from time t6 to time t11), the brake ECU 26 repeats making a judgment of "NO" at step 116 and continues to hold the boost control on (step 120). Then, as the master cylinder pressure becomes lower than the second judgment value (time t11), the brake ECU 26 makes a judgment of "YES" at step 116 and turns the boost control off (step 118). The time period from time t6 to time t11 is longer than that from time t6 to time t10.

Now, comparison is made with respective cases that the first and second judgment values are used after the brake pedal 21 is released from being stepped down. In the case of using the second judgment value, the boost control is turned off later than in the case of using the first judgment value. That is, in the case of using the second judgment value, because the time period during which the boost control is held on though the stepping-down has been released is long, there has arisen a problem that a delay in the response to such release is felt by the driver. In the case of using the first judgment value, on the other hand, the time period during which the boost control is held on after the release of the stepping-down can be shortened, and thus, it become possible to suppress the occurrence of a delay in the response to such release.

After time t10 at which the boost control is turned off, the processing of the steps 127 to 138 which uses the first judgment value is executed until the counter (i) exceeds the judgment value (ia) (i.e, during the period from time t10 to time t12). When the counter (i) exceeds the judgment value (ia) (i.e., time t12), the flag F and the counter (i) are cleared to zero (step 140). Thus, even in the return motion of the brake pedal 21, a judgment of "NO" is made at step 127, and the second judgment value is used as the boosting limit judgment pressure at step 116. Since the master cylinder pressure has become lower than the second judgment value, a judgment of "YES" is made at step 116, and the boost control is continued to be held off.

Next, description will be made regarding the operation in the case that the brake pedal 21 is returned slowly. The operation from the stepping-down start of the brake pedal 21 to the stepping release start (the returning start) of the brake pedal 21 is the same as that in the case that the brake pedal 21 is returned quickly, and thus, the description of such operation will be omitted for the sake of brevity. After the time (time t6) at which the stepping release (the returning) of the brake pedal 21 is started, the reducing speed of the master cylinder pressure becomes slow (as indicated by the solid broken line in FIG. 11) in comparison with that in the case of the quick return.

At time t6 when the stepping release (the returning) of the brake pedal 21 is started, the master cylinder pressure begins to decrease. Then, when the stepping release (the returning) of the brake pedal 21 ends, the master cylinder pressure goes down to zero at time t15. At this time, the vacuum pressure in the vacuum pressure chamber 22*d* is the same as that in the case of the quick return. Accordingly, the second judgment value calculated from the vacuum pressure in the vacuum pressure chamber 22*d* is also the same as that in the case of the quick return. Further, the first judgment value is also the same as that in the case of the quick return.

After time t6, the first judgment value is used as the boosting limit judgment pressure until the second judgment value comes to be used again (i.e., until time t17). Until the master cylinder pressure becomes lower than the first judgment value in the return motion of the brake pedal 21 (for the period from time t6 to time t16), the brake ECU 26 repeats making a judgment of "NO" at step 128 and continues to hold the boost control on (step 120). Then, when the master cylinder pressure becomes lower than the first judgment value (time t16), the brake ECU 26 makes a judgment of "YES" at step 128 and turns the boost control off (step 130).

After time t16 at which the boost control is turned off, the processing of the steps 127 to 138 which uses the first judgment value is executed until the counter (i) exceeds the judgment value (ib) (i.e., the period from time t16 to time 17). When the counter (i) exceeds the judgment value (ib) at time t17, the flag F and the counter (i) are cleared to zero (step 140). Thus, a judgment of "NO" is made at step 127 even in the return motion of the brake pedal 21, and the second judgment value is used as the judgment boosting limit value at step 116. Since the master cylinder pressure has become lower than the second judgment value, a judgment of "YES" is made at step 116, and thus, the boost control is continued to be held off.

As apparent from the foregoing description, in the present embodiment, the boost control means (26*e*, steps 116, 128, 118, 120, 130) executes the boost control. In the boost control, the boost control means drives the hydraulic pumps (44*a*, 54*a*) to build up the additional or controlled break hydraulic pressure by the driving of the hydraulic pumps and supplies each wheel cylinder (WC) with the resultant hydraulic pressure which is made by adding the additional or controlled break hydraulic pressure to the master cylinder pressure built up in dependence on the manipulation of the brake manipulation member (21) if the master cylinder pressure acquired by the master cylinder pressure acquisition means (26***b*, step 102) is equal to or higher than the boosting limit judgment pressure (the first judgment value or the second judgment value) calculated by the boosting limit judgment pressure calculation means (26*d*, step 104), and stops the driving of the hydraulic pumps (44*a*, 54*a*) if the master cylinder pressure is lower than the boosting limit judgment pressure. Further, if the predetermined conditions are satisfied when the boost control means (26*e*, steps 116, 128, 118, 120, 130) is driving the hydraulic pumps (44*a*, 54*a*) (i.e., when the boost control is held on), the first judgment value derivation and storage means (26*h*, steps 108, 110, 122, 124) derives and stores as the first judgment value the boosting limit judgment pressure which is calculated by the boosting limit judgment pressure calculation means (26*d*, step 104) at the time when the predetermined conditions are satisfied. The returning start judgment means (26*f*, step 110) judges whether the returning of the brake manipulation member (21) is started or not. Then, if the returning start judgment means (26*f*, step 110) judges during the driving of the hydraulic pumps (44*a*, 54*a*) that the returning of the brake manipulation member (21) has been started, the boost control means (26*e*, steps 116, 128, 118, 120, 130) executes the boost control using as the boosting limit judgment pressure the first judgment value stored in the first judgment value derivation and storage means (26*h*, steps 108, 110, 122, 124).

Thus, when the returning of the brake manipulation member is started during the driving of the hydraulic pumps by the boost control means, the boost control is not executed by the use of the boosting limit judgment pressure which fluctuates with the change in the vacuum pressure in the vacuum pressure chamber (22*d*) of the vacuum booster (22) in the course of the returning of the brake manipulation member, but can be executed by the use of the first judgment value which has been calculated and stored based on the vacuum pressure at the time when the predetermined conditions are satisfied and which does not fluctuate with the change in the vacuum pressure. Accordingly, even when the vacuum pressure in the vacuum pressure chamber (22*d*) of the vacuum booster (22) fluctuates, the driving of the hydraulic pumps (44*a*, 54*a*) under the boost control can be terminated at a desired, appropriate timing without being subjected to the influence of the fluctuation.

The aforementioned predetermined conditions includes a requisite that the vacuum pressure in the vacuum pressure chamber (22*d*) of the vacuum booster (22) is placed in a stable state with the vacuum pressure remaining within a predetermined range (the period from time t5 to time t6 in FIG. 11;

step 108) before the returning start judgment means (26f, step 110) judges that the returning of the brake manipulation member (21) has been started. Thus, the first judgment value being stable can be calculated and stored based on the vacuum pressure of the vacuum pressure chamber in which fluctuation has relatively been suppressed, and hence, the boost control being high in stability can be executed by using the stable first judgment value as the boosting limit judgment pressure.

Further, the aforementioned predetermined conditions further include another condition that the returning start judgment means (26f, step 110) judges that the returning of the brake manipulation member (21) has been started. Thus, it can be realized to execute the boost control under which the first judgment value (boosting limit judgment pressure) is stored based on the vacuum pressure in the vacuum pressure chamber (22d) at the time (time t6 in FIG. 11) when the returning of the brake manipulation member (21) is started and under which the driving of the hydraulic pumps (44a, 54a) can be stopped at an appropriate timing based on the first judgment value.

Further, the aforementioned predetermined conditions are those just before or just after the returning start judgment means (26f, step 110) judges that the returning of the brake manipulation member (21) is started. Thus, it can be realized to execute the boost control under which the first judgment value (boosting limit judgment pressure) is stored based on the vacuum pressure in the vacuum pressure chamber (22d) just before or just after the time (time t6 in FIG. 11) when the returning of the brake manipulation member (21) is started and under which the driving of the hydraulic pumps (44a, 54a) can be stopped at an appropriate timing based on the first judgment value.

Further, the boost control means (26e, steps 130-142) inhibits resuming the driving of the hydraulic pumps (44a, 54a) for a predetermined time period from the time (time t10 or time t16 in FIG. 11) when the driving of the hydraulic pumps (44a, 54a) is stopped. Thus, in terminating the driving of the hydraulic pumps (44a, 54a) under the boost control, a hunting phenomenon in which driving is started immediately after stopping can be suppressed, and hence, it becomes possible to terminate the driving of the hydraulic pumps (44a, 54a) properly and to enhance the controllability in the boost control.

Further, the boost control means (26e, steps 134, 136, 142) alters the aforementioned predetermined time period in dependence on the dropping speed of the master cylinder pressure. Thus, it can be realized to execute the boost control properly in dependence on the dropping speed of the master cylinder pressure after the returning of the brake manipulation member (21) is started.

Furthermore, the boost control means (26e, steps 134, 136, 142) sets the predetermined time period to be longer as the dropping speed of the master cylinder pressure goes down. Thus, it can be realized to execute the boost control properly in dependence on the dropping speed of the master cylinder pressure after the returning of the brake manipulation member (21) is started.

Obviously, numerous modifications and variations of the present invention are possible in light of the above teachings. It is therefore to be understood that within the scope of the appended claims, the present invention may be practiced otherwise than as specifically described herein.

What is claimed is:

1. A control device for a vehicle brake system having:
a master cylinder for building up a brake hydraulic pressure depending on the manipulation of a brake manipulation member;
a vacuum booster for boosting the manipulation force of the brake manipulation member by utilizing a pressure difference between a vacuum pressure chamber supplied with a vacuum pressure and a variable pressure chamber adjoining the vacuum pressure chamber through a diaphragm, to output the boosted manipulation force to the master cylinder;
wheel cylinders for applying a brake force to respective wheels of a vehicle upon receipt of the brake hydraulic pressure supplied from the master cylinder;
a hydraulic pump connected to fluid passages connecting the master cylinder to the wheel cylinders for building up a brake hydraulic pressure by being driven by an output of an electric motor and for supplying the wheel cylinders with the brake hydraulic pressure independently of the master cylinder;
a vacuum pressure sensor for detecting the vacuum pressure in the vacuum pressure chamber of the vacuum booster; and
a master cylinder pressure sensor for detecting the pressure in the master cylinder;
wherein the control device comprises:
vacuum pressure acquisition means for acquiring the vacuum pressure in the vacuum pressure chamber of the vacuum booster from the vacuum pressure sensor;
master cylinder pressure acquisition means for acquiring the pressure in the master cylinder from the master cylinder pressure sensor;
first storage means for storing a vacuum-boosting limit pressure map representing a relation between various vacuum pressures in the vacuum pressure chamber of the vacuum booster and various boosting limit pressures being pressures in the master cylinder which respectively correspond to various boosting limits of the vacuum booster at the various vacuum pressures;
boosting limit judgment pressure calculation means for calculating as the boosting limit judgment pressure a boosting limit pressure which is calculated from a vacuum pressure acquired by the vacuum pressure acquisition means and the vacuum-boosting limit pressure map stored in the first storage means;
boost control means for executing a boost control that if the master cylinder pressure acquired by the master cylinder pressure acquisition means is equal to or higher than the boosting limit judgment pressure calculated by the boosting limit judgment pressure calculation means, the boost control means drives the hydraulic pump to build up a brake hydraulic pressure and supplies the wheel cylinders with a resultant hydraulic pressure which is made by adding the pump-built hydraulic pressure to a master cylinder pressure built up in dependence on the manipulation of the brake manipulation member and that if the master cylinder pressure is lower than the boosting limit judgment pressure, the boost control means stops the driving of the hydraulic pump;
first judgment value derivation and storage means for deriving and storing as first judgment value a boosting limit judgment pressure which, if a predetermined condition is satisfied during the driving of the hydraulic pump by the boost control means, the boosting limit judgment pressure calculation means calculates at the time when the predetermined conditions is satisfied; and
returning start judgment means for judging whether the returning of the brake manipulation member is started or not;
wherein the boost control means executes the boost control using as the boosting limit judgment pressure the first judgment value stored in the first judgment value derivation and storage means when the returning start judgment means judges during the driving of the pump that the returning of the brake manipulation member is started.

2. The control device as set forth in claim 1, wherein the predetermined condition includes a first requisite that the vacuum pressure in the vacuum pressure chamber of the vacuum booster is in a stable state with the vacuum pressure being within a predetermined range.

3. The control device as set forth in claim 1, wherein the predetermined condition includes a second requisite that the returning start judgment means judges that the returning of the brake manipulation member has been started.

4. The control device as set forth in claim 1, wherein the predetermined condition is the condition that is required just before or just after the returning start judgment means judges that the returning of the brake manipulation member is started.

5. The control device as set forth in claim 1, wherein the boost control means inhibits resuming the driving of the hydraulic pump for a predetermined time period from the time when the driving of the hydraulic pump is stopped.

6. The control device as set forth in claim 5, wherein the boost control means alters the predetermined time period in dependence on the dropping speed of the master cylinder pressure.

7. The control device as set forth in claim 5, wherein the boost control means sets the predetermined time period longer as the dropping speed of the master cylinder becomes slower.

8. The control device as set forth in claim 2, wherein the boost control means inhibits resuming the driving of the hydraulic pump for a predetermined time period from the time when the driving of the hydraulic pump is stopped.

9. The control device as set forth in claim 3, wherein the boost control means inhibits resuming the driving of the hydraulic pump for a predetermined time period from the time when the driving of the hydraulic pump is stopped.

10. The control device as set forth in claim 4, wherein the boost control means inhibits resuming the driving of the hydraulic pump for a predetermined time period from the time when the driving of the hydraulic pump is stopped.

* * * * *